United States Patent
Sato et al.

(10) Patent No.: US 12,259,555 B2
(45) Date of Patent: Mar. 25, 2025

(54) IMAGE DISPLAY APPARATUS INCLUDING A CHOLESTERIC LIQUID CRYSTAL LAYER HAVING A PITCH GRADIENT STRUCTURE AND AR GLASSES

(71) Applicant: FUJIFILM Corporation, Tokyo (JP)

(72) Inventors: Hiroshi Sato, Minamiashigara (JP); Katsumi Sasata, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/848,994

(22) Filed: Jun. 24, 2022

(65) Prior Publication Data
US 2022/0382060 A1 Dec. 1, 2022

Related U.S. Application Data

(63) Continuation of application No. PCT/JP2020/047146, filed on Dec. 17, 2020.

(30) Foreign Application Priority Data

Dec. 27, 2019 (JP) ................................ 2019-238202

(51) Int. Cl.
*G02B 27/01* (2006.01)
*G02F 1/1335* (2006.01)
*G02F 1/1337* (2006.01)

(52) U.S. Cl.
CPC ............ *G02B 27/0172* (2013.01); *G02F 1/133543* (2021.01); *G02F 1/1337* (2013.01); *G02B 2027/0178* (2013.01)

(58) Field of Classification Search
CPC ................. G02F 1/133788; G02F 1/13718
See application file for complete search history.

(56) References Cited

U.S. PATENT DOCUMENTS 5,050,966 A 9/1991 Berman
2012/0147288 A1 6/2012 Jeong et al.
(Continued)

FOREIGN PATENT DOCUMENTS

CN 107003455 A 8/2017
JP 2-132411 A 5/1990
(Continued)

OTHER PUBLICATIONS

International Preliminary Report on Patentability dated Jul. 7, 2022, and English translation of the Written Opinion of the International Searching Authority for International Application No. PCT/JP2020/047146, dated Feb. 16, 2021.
(Continued)

*Primary Examiner* — Lauren Nguyen
(74) *Attorney, Agent, or Firm* — Birch, Stewart, Kolasch & Birch, LLP

(57) ABSTRACT

Provided are: an image display apparatus in which the utilization efficiency of a virtual image is high and the virtual image having high brightness uniformity can be displayed to be superimposed on a real image; and AR glasses including the image display apparatus. The image display apparatus includes: a display element; one or more cholesteric liquid crystal layers that reflect a display image of the display element; and a transparent reflection element that reflects the image reflected by the cholesteric liquid crystal layer to the cholesteric liquid crystal layer, in which at least one of the cholesteric liquid crystal layers has a structure having a region where a surface pitch changes in a thickness direction.

9 Claims, 10 Drawing Sheets

(56) References Cited

U.S. PATENT DOCUMENTS

| | | | |
|---|---|---|---|
| 2017/0261666 A1 | 9/2017 | Anzai et al. | |
| 2018/0164480 A1* | 6/2018 | Yoshida | G02B 5/10 |
| 2021/0011295 A1 | 1/2021 | Sato et al. | |

FOREIGN PATENT DOCUMENTS

| | | | | |
|---|---|---|---|---|
| JP | 08-136856 | * | 5/1995 | G02F 1/13 |
| JP | 8-136856 A | | 5/1996 | |
| JP | 2004-302388 A | | 10/2004 | |
| JP | 2018-180122 A | | 11/2018 | |
| JP | 2019-15783 A | | 1/2019 | |
| KR | 10-2017-0080250 A | | 7/2017 | |
| WO | WO-2011-016682 | * | 2/2011 | H01S 3/102 |
| WO | WO 2016/194961 A1 | | 12/2016 | |
| WO | WO 2019/189852 A1 | | 10/2019 | |

OTHER PUBLICATIONS

International Search Report for International Application No. PCT/JP2020/047146, dated Feb. 16, 2021, with English translation.
Japanese Office Action for corresponding Japanese Application No. 2021-567362, dated Jun. 13, 2023, with English translation.
Japanese Office Action for corresponding Japanese Application No. 2021-567362, dated Aug. 22, 2023, with English translation.
Chinese Office Action and Search Report for Chinese Application No. 202080090586.9, dated Sep. 28, 2023, with a partial English translation.

* cited by examiner

IMAGE DISPLAY APPARATUS INCLUDING A CHOLESTERIC LIQUID CRYSTAL LAYER HAVING A PITCH GRADIENT STRUCTURE AND AR GLASSES

CROSS-REFERENCE TO RELATED APPLICATIONS

This application is a Continuation of PCT International Application No. PCT/JP2020/047146 filed on Dec. 17, 2020, which claims priority under 35 U.S.C. § 119(a) to Japanese Patent Application No. 2019-238202 filed on Dec. 27, 2019. Each of the above applications is hereby expressly incorporated by reference, in its entirety, into the present application.

BACKGROUND OF THE INVENTION

1. Field of the Invention

The present invention relates to an image display apparatus that are used in AR glasses or the like and AR glasses including the image display apparatus.

2. Description of the Related Art

Recently, a display device such as augmented reality (AR) glasses or a head-up display (HUD) that displays augmented reality by displaying a virtual image such as various images or various information to be superimposed on a scene (real scene) that is actually being seen has been put into practice.

The AR glasses are also called smart glasses.

FIG. 12 conceptually shows an example of the image display apparatus that displays augmented reality.

This image display apparatus 100 includes a display element 102 that displays a virtual image A (an image that forms the virtual image A), a lens 104, a beam splitter 106, and a curved half mirror 108.

In the image display apparatus 100, the virtual image A displayed (projected) by the display element 102 is focused by the lens 104, is reflected to the curved half mirror 108 by the beam splitter 106, and is reflected by the curved half minor 108 to be observed by a user U.

On the other hand, a real scene R transmits through the curved half mirror 108 and the beam splitter 106 to be observed by the user U.

Therefore, in the image display apparatus 100, the user U can observe augmented reality in a state where the virtual image A and the real scene R are superimposed on each other.

Here, the image display apparatus in the related art that displays augmented reality has a problem in that the utilization efficiency of the virtual image A displayed by the display element 102 is low.

As described above, the virtual image A displayed by the display element 102 is reflected by the beam splitter 106, is reflected by the curved half mirror 108, and transmits through the beam splitter 106 to be observed by the user U. Accordingly, the virtual image A is reduced by half in light amount during the reflection by the beam splitter 106, and subsequent is also reduced by half in light amount during the transmission through the beam splitter 106. That is, in the image display apparatus 100, the virtual image A displayed by the display element 102 is reduced to ¼ in light amount by the beam splitter 106.

Further, the virtual image A is reduced in light amount by the curved half mirror 108. By increasing the reflectivity of the virtual image A reflected by the curved half mirror 108, the light reduction of the virtual image A by the curved half mirror 108 can be reduced.

However, in this case, the transmittance of the curved half mirror 108 with respect to the real scene R decreases. Therefore, the real scene R is darkened.

On the other hand, JP1996-136856A (JP-H8-136856A) describes that, a cholesteric liquid crystal layer (cholesteric liquid crystal element) obtained by immobilizing a cholesteric liquid crystalline phase is used instead of the beam splitter 106 in the image display apparatus 100 shown in FIG. 12.

In the display device (light collimating device) described in JP1996-136856A (JP-H8-136856A), the utilization efficiency (image transmission property) of the virtual image A displayed by the display element 102 is improved by using the cholesteric liquid crystal layer.

As is well-known, the cholesteric liquid crystal layer (cholesteric liquid crystalline phase) selectively reflects right circularly polarized light or left circularly polarized light in a specific wavelength range.

Accordingly, in the image display apparatus described in JP1996-136856A (JP-H8-136856A), the display element 102 displays the virtual image A as right or left circularly polarized light by using a display member such as a liquid crystal display and a λ/4 plate in combination, the display member emitting linearly polarized light.

For example, it is assumed that the virtual image A is right circularly polarized light and the cholesteric liquid crystal layer selectively reflects right circularly polarized light.

The virtual image A as right circularly polarized light is reflected by the cholesteric liquid crystal layer that is provided instead of the beam splitter 106.

The virtual image A as right circularly polarized light reflected by the cholesteric liquid crystal layer is also reflected to the cholesteric liquid crystal layer by the curved half mirror 108. Here, due to the reflection by the curved half mirror 108, the virtual image A as right circularly polarized light is converted into left circularly polarized light.

The virtual image A as left circularly polarized light reflected by the curved half mirror 108 is incident into the cholesteric liquid crystal layer again. Here, the cholesteric liquid crystal layer selectively reflects right circularly polarized light. Accordingly, ideally, 100% of the virtual image A as left circularly polarized light transmits through the cholesteric liquid crystal layer without being reflected by the cholesteric liquid crystal layer.

Accordingly, in the image display apparatus described in JP1996-136856A (JP-H8-136856A) in which the cholesteric liquid crystal layer is used instead of the beam splitter 106, ideally, the virtual image A can be emitted to the observation position by the user U without being reduced in light amount by the cholesteric liquid crystal layer.

In the image display apparatus, in the real scene R, right circularly polarized light in a selective reflection wavelength range is reflected by the cholesteric liquid crystal layer, and other light components transmit through the cholesteric liquid crystal layer. Accordingly, in this image display apparatus, the user U can observe an image in the virtual reality where the virtual image A and the real scene R are superimposed on each other as in the image display apparatus 100 shown in FIG. 12.

SUMMARY OF THE INVENTION

Here, it is known that, in a case where light is incident into the cholesteric liquid crystal layer from an oblique direction, so-called blue shift (short wavelength shift) in which the selective reflection wavelength range is shifted to a shorter wavelength side occurs. Specifically, light being incident from an oblique direction represents light being incident from a direction having an angle with respect to a normal line of a main surface of the cholesteric liquid crystal layer.

That is, even in a case where light in the reflection wavelength range of the cholesteric liquid crystal layer is incident into the cholesteric liquid crystal layer from an oblique direction, the light is not reflected due to the blue shift depending on the incidence angle with respect to the normal line.

In the image display apparatus that displays augmented reality in which the virtual image is superimposed on the real scene, the virtual image needs to be incident into the cholesteric liquid crystal layer from an oblique direction and thus is largely affected by the blue shift.

In addition, in the image display apparatus that displays augmented reality using the cholesteric liquid crystal layer, for example, in a case where the display element is a liquid crystal display, the incidence angle of light of the virtual image into the cholesteric liquid crystal layer varies depending on positions in a display screen. In addition, in the case of a display element using light scanning, the incidence angle of light of the virtual image into the cholesteric liquid crystal layer varies depending on positions in a scanning direction.

Therefore, in the image display apparatus that displays augmented reality using the cholesteric liquid crystal layer as described in JP1996-136856A (JP-H8-136856A), the reflectivity of the virtual image partially decreases due to the blue shift of the cholesteric liquid crystal layer such that the brightness of the virtual image becomes non-uniform.

An object of the present invention is to solve the above-described problem of the related art and to provide: an image display apparatus in which augmented reality where a virtual image is superimposed on a real scene is displayed, the utilization efficiency of a virtual image displayed by a display element is improved using a cholesteric liquid crystal layer, and the brightness uniformity of the virtual image is excellent; and AR glasses including the image display apparatus.

In order to achieve the object, the present invention has the following configurations.

[1] An image display apparatus comprising:
a display element;
a cholesteric liquid crystal layer that reflects an image displayed by the display element and is obtained by immobilizing a cholesteric liquid crystalline phase; and
a transparent reflection element that reflects the image of the display element reflected by the cholesteric liquid crystal layer to the cholesteric liquid crystal layer,
in which one or more cholesteric liquid crystal layers are provided and at least one of the cholesteric liquid crystal layers has a pitch gradient structure that is a structure having a region where a surface pitch changes in a cross section of the cholesteric liquid crystal layer observed with a scanning electron microscope, the surface pitch being an interval of bright portions and dark portions derived from the cholesteric liquid crystalline phase.

[2] The image display apparatus according to [1],
in which the cholesteric liquid crystal layer has a liquid crystal alignment pattern in which a direction of an optical axis derived from a liquid crystal compound changes while continuously rotating in at least one in-plane direction.

[3] The image display apparatus according to [1] or [2],
in which a plurality of the cholesteric liquid crystal layers having different selective reflection center wavelengths are provided.

[4] The image display apparatus according to [2] or [3],
in which a plurality of the cholesteric liquid crystal layers having different selective reflection center wavelengths have a liquid crystal alignment pattern in which a direction of an optical axis derived from a liquid crystal compound changes while continuously rotating in at least one in-plane direction, and
in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, a permutation of lengths of the selective reflection center wavelengths and a permutation of lengths of the single periods match each other in the plurality of cholesteric liquid crystal layers having different selective reflection center wavelengths.

[5] The image display apparatus according to any one of [1] to [4],
in which all of the cholesteric liquid crystal layers have the pitch gradient structure.

[6] The image display apparatus according to any one of [1] to [5],
in which a selective reflection wavelength range of the cholesteric liquid crystal layer having the pitch gradient structure is 80 nm or more.

[7] The image display apparatus according to [6],
in which only one cholesteric liquid crystal layer is provided.

[8] The image display apparatus according to any one of [1] to [7],
in which a retardation plate is provided between the display element and the cholesteric liquid crystal layer.

[9] The image display apparatus according to [8],
in which the retardation plate is a $\lambda/4$ wave plate.

[10] AR glasses comprising:
the image display apparatus according to any one of [1] to [9].

According to an aspect of the present invention, in an image display apparatus in which augmented reality where a virtual image is superimposed on a real scene is displayed, the utilization efficiency of a virtual image displayed by a display element can be improved, and the virtual image having excellent brightness uniformity can be displayed.

DESCRIPTION OF THE PREFERRED EMBODIMENTS

Hereinafter, an image display apparatus and AR glasses according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

Figure 1:
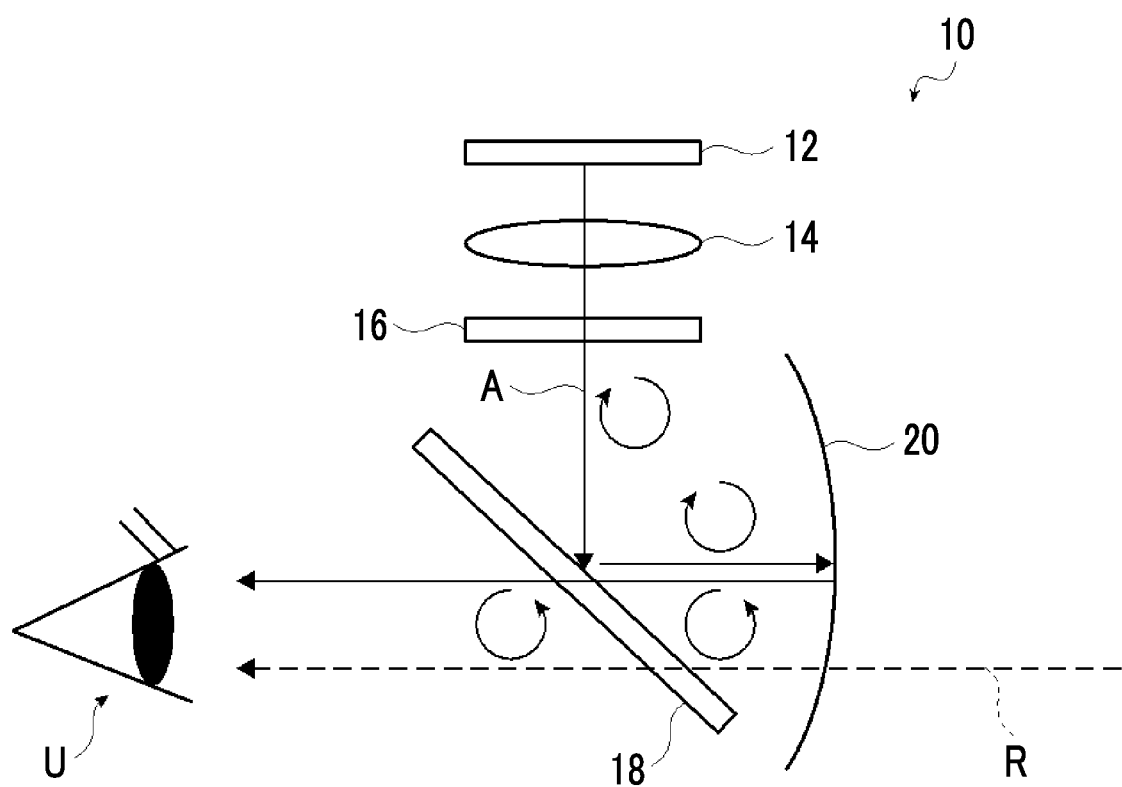
FIG. 1 is a diagram conceptually showing an example of an image display apparatus according to the present invention.

FIG. 1 conceptually shows an example of the image display apparatus according to the embodiment of the present invention.

The image display apparatus according to the embodiment of the present invention is an image display apparatus that displays augmented reality where a virtual image A is superimposed on a real scene R and is used in AR glasses, a HUD, a head-mounted display (HMD), or the like.

An image display apparatus 10 shown in FIG. 1 includes a display element 12, a lens 14, a retardation plate 16, a cholesteric liquid crystal element 18, and a curved half mirror 20.

In the image display apparatus 10, the real scene R transmits through the curved half mirror 20 and the cholesteric liquid crystal element 18 to be observed by a user U.

On the other hand, although described below in detail, the virtual image A (projected image) displayed by the display element 12 is focused by the lens 14, is converted into predetermined circularly polarized light by the retardation plate 16, and is reflected to the curved half mirror 20 by the cholesteric liquid crystal element 18. Next, the virtual image A is reflected to the cholesteric liquid crystal element 18 by thee curved half mirror 20, is converted into circularly polarized light having an opposite direction, and transmits through the cholesteric liquid crystal element 18 to be observed by the user U.

As a result, the user U of the image display apparatus 10 observes augmented reality where the virtual image A is superimposed on the real scene R.

The image display apparatus 10 in the example shown in the drawing is, for example, AR glasses. Accordingly, the curved half mirror 20 is a spectacle lens in AR glasses. In addition, the display element 12 displays (projects) the virtual image A from the top in a state where the AR glasses are worn.

Hereinafter, each of the components in the image display apparatus according to the embodiment of the present invention will be described.

[Display Element]

In the image display apparatus 10 according to the embodiment of the present invention, the display element 12 displays (projects) the virtual image A. In other words, the display element 12 displays (projects) an image that forms the virtual image A.

In the present invention, as the display element 12, various well-known display elements (a display device or a projector) used for AR glasses or the like can be used without any particular limitation.

Accordingly, the display in the display element 12 is not particularly limited. For example, various well-known display elements 12 used in AR glasses, a HUD, or the like can be used. Examples of the display element 12 include a liquid crystal display (LCD), an organic electroluminescent display (OLED (organic light emitting diode)), a liquid crystal on silicon (LCOS) display, a scanning type display including a laser light source and a micro electro mechanical systems (MEMS) element, and a digital light processing (DLP) display.

In the image display apparatus 10 according to the embodiment of the present invention, it is preferable that the display element 12 displays the virtual image A of linearly polarized light.

Accordingly, in a case where a display such as a LCD that displays an image of linearly polarized light is used as the display, the display element 12 can be formed using only the display.

On the other hand, in a case where a display such as an OLED that displays an image of unpolarized light is used as the display, it is preferable that the display element 12 is formed using the display and a polarizer in combination to display an image of linearly polarized light.

The polarizer is not particularly limited, and various well-known polarizers can be used. Accordingly, as the polarizer, any of an iodine polarizer, a dye-based polarizer using a dichroic dye, a polyene polarizer, or a polarizer formed of a material that polarizes light by UV absorption may be used.

[Lens]

The lens 14 is a well-known condenser lens that focuses the virtual image A displayed by the display element 12.

[Retardation Plate]

The retardation plate 16 converts the virtual image A of linearly polarized light that is displayed by the display element 12 and focused by the lens 14 into the virtual image A of predetermined circularly polarized light corresponding to the cholesteric liquid crystal element 18. In the image display apparatus 10 in the example shown in the drawing, the retardation plate 16 converts the virtual image A of linearly polarized light into the virtual image A of right circularly polarized light.

It is preferable that the retardation plate 16 is a λ/4 plate (¼ wave plate).

As is well known, the cholesteric liquid crystalline phase selectively reflects right or left circularly polarized light. Accordingly, by using the λ/4 plate as the retardation plate 16, the virtual image A of linearly polarized light is suitably converted into the virtual image A of right circularly polarized light such that the utilization efficiency of the virtual image A displayed by the display element 12 can be improved.

As the retardation plate 16, a well-known retardation plate can be used. For example, various well-known retardation plates, for example, a cured layer or a structural birefringent layer of a polymer or a liquid crystal compound can be used.

As the retardation plate 16, a retardation plate in which a plurality of retardation plates are laminated to effectively exhibit a desired action is also preferable. As a λ/4 plate, a retardation plate in which a plurality of retardation plates are laminated to effectively function as a λ/4 plate is also preferably used. For example, a broadband λ/4 plate described in WO2013/137464A in which a λ/2 plate and a λ/4 plate are used in combination can handle with incidence light in a wide wavelength range and can be preferably used.

Further, it is preferable that the retardation plate 16 has reverse wavelength dispersibility. In a case where the retardation plate 16 has reverse wavelength dispersibility, incidence light in a wide wavelength range can be handled.

The retardation plate 16 is disposed in a state where a direction of a slow axis is adjusted such that the linearly polarized light is converted into circularly polarized light having a desired turning direction depending on a polarization direction of the linearly polarized light of the image displayed by the display element 12.

FIG. 1 shows an example in which the retardation plate 16 is disposed downstream of the lens 14. However, the retardation plate 16 may be disposed upstream of the lens 14 or may be disposed in a state where the display element 12 and the retardation plate 16 are integrated.

[Cholesteric Liquid Crystal Element]

Figure 2:
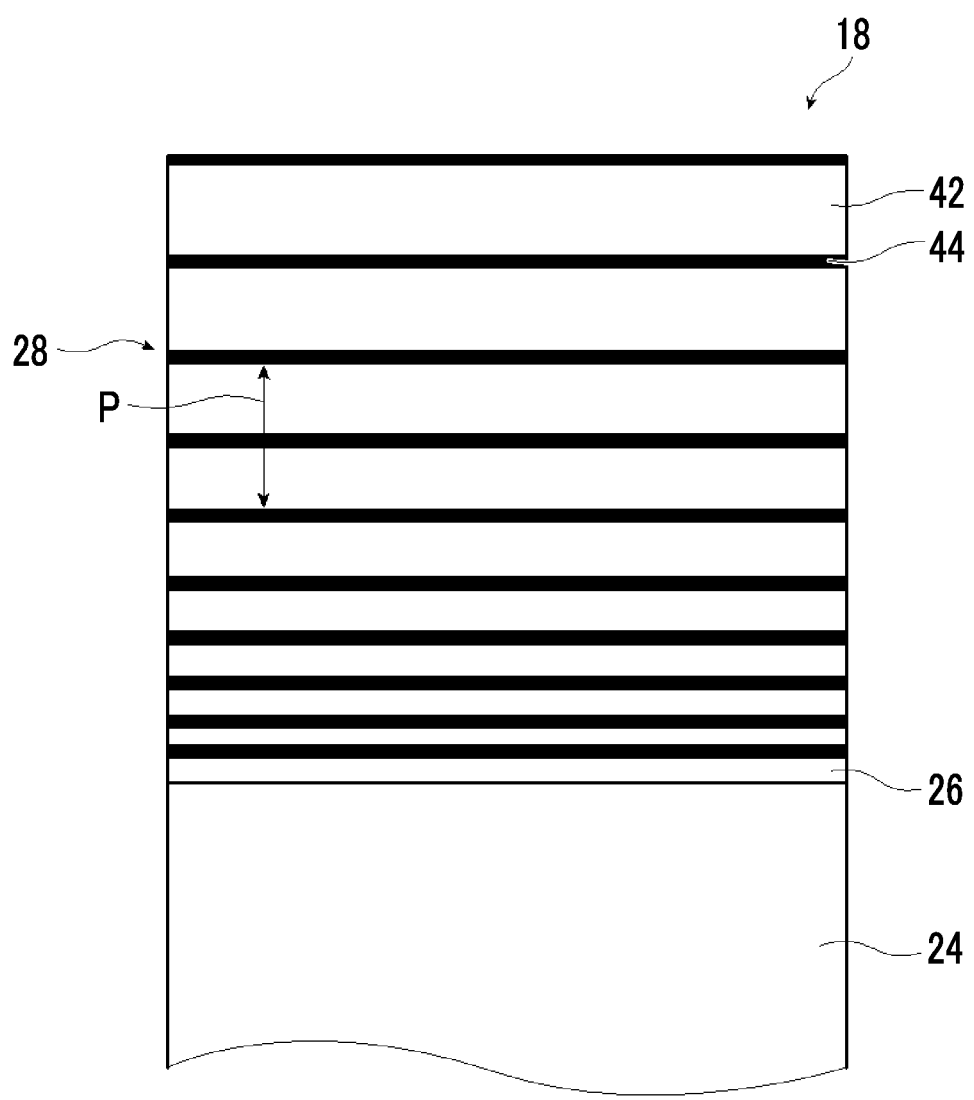
FIG. 2 is a diagram conceptually showing a cholesteric liquid crystal element.

FIG. 2 conceptually shows an example of the cholesteric liquid crystal element 18. The cholesteric liquid crystal element 18 includes a support 24, an alignment film 26, and a cholesteric liquid crystal layer 28.

The cholesteric liquid crystal layer 28 is obtained by immobilizing a cholesteric liquid crystalline phase. As is well known, the cholesteric liquid crystalline phase has a helical structure in which a liquid crystal compound is helically turned and laminated, selectively reflects right circularly polarized light or left circularly polarized light in a predetermined wavelength range, and allow transmission of the other light.

For example, the cholesteric liquid crystal layer 28 in the example shown in the drawing selectively reflects green right circularly polarized light and allows transmission of the other light. Accordingly, in the image display apparatus 10, it is preferable that the display element 12 displays a green monochromic image.

In the image display apparatus 10 according to the embodiment of the present invention, the cholesteric liquid crystal layer 28 has a pitch gradient structure that is a structure having a region where a surface pitch changes in a thickness direction in a cross section observed with a scanning electron microscope (SEM), the surface pitch being an interval of bright portions and dark portions derived from the cholesteric liquid crystalline phase.

The cholesteric liquid crystal element 18 shown in FIG. 2 includes the support 24, the alignment film 26, and the cholesteric liquid crystal layer 28. However, the present invention is not limited to this configuration.

For example, the cholesteric liquid crystal element 18 may include only the alignment film 26 and the cholesteric liquid crystal layer 28 by peeling off the support 24 after forming the cholesteric liquid crystal layer 28. Alternatively, the cholesteric liquid crystal element 18 may include only the cholesteric liquid crystal layer 28 by peeling off the support 24 and the alignment film 26 after forming the cholesteric liquid crystal layer 28.

<Support>

The support 24 supports the alignment film 26 and the cholesteric liquid crystal layer 28.

As the support 24, various sheet-shaped materials (films, plate-shaped materials, or layers) can be used as long as they can support the alignment film 26 and the cholesteric liquid crystal layer 28.

A transmittance of the support 24 with respect to corresponding light is preferably 50% or higher, more preferably 70% or higher, and still more preferably 85% or higher.

The thickness of the support 24 is not particularly limited and may be appropriately set depending on the use of the cholesteric liquid crystal element 18, a material for forming the support 24, and the like in a range where the alignment film 26 and the cholesteric liquid crystal layer 28 can be supported.

The thickness of the support 24 is preferably 1 to 2000 μm, more preferably 3 to 500 μm, and still more preferably 5 to 250 m.

The support 24 may have a monolayer structure or a multi-layer structure.

In a case where the support 24 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 24 has a multi-layer structure, examples thereof include a support including: one of the above-described supports having a monolayer structure that is provided as a substrate; and another layer that is provided on a surface of the substrate.

<Alignment Film>

In the cholesteric liquid crystal element 18 in the example shown in the drawing, the alignment film 26 is formed on a surface of the support 24.

During the formation of the cholesteric liquid crystal layer 28, the alignment film 26 aligns a liquid crystal compound for forming the cholesteric liquid crystal layer 28 to a desired alignment state (liquid crystal alignment pattern).

As the alignment film 26, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 26 formed by a rubbing treatment can be formed by rubbing a surface of a polymer layer with paper or fabric in a given direction multiple times.

As the material used for the alignment film 26, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the cholesteric liquid crystal element 18, for example, the alignment film 26 can be suitably used as a so-called photo-alignment film obtained by irradiating a photo-alignment material with polarized light or non-polarized light. That is, in the cholesteric liquid crystal element 18, a photo-alignment film that is formed by applying the photo-alignment material to the support 24 can also be used as the alignment film 26.

The photo-alignment film is particularly suitably used for forming a cholesteric liquid crystal layer described below having a liquid crystal alignment pattern in which a direction of an optical axis derived from the liquid crystal compound changes while continuously rotating in one in-plane direction.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 26 is not particularly limited. The thickness with which a required alignment function can be obtained may be appropriately set depending on the material for forming the alignment film 26.

The thickness of the alignment film 26 is preferably 0.01 to 5 μm and more preferably 0.05 to 2 μm.

In the present invention, the alignment film 26 is provided as a preferable aspect and is not a configuration requirement.

For example, the support 24 can be made to function as the alignment film by forming the alignment pattern on the support 24, for example, using a method of rubbing the support 24, a method of processing the support 24 with laser light or the like.

<Cholesteric Liquid Crystal Layer>

In the cholesteric liquid crystal element 18, the cholesteric liquid crystal layer 28 is formed on a surface of the alignment film 26.

As described above, the cholesteric liquid crystal layer 28 is a cholesteric liquid crystal layer obtained by immobilizing a cholesteric liquid crystalline phase.

It is known that the cholesteric liquid crystalline phase exhibits selective reflectivity at a specific wavelength.

A center wavelength of selective reflection (selective reflection center wavelength) λ of a general cholesteric liquid crystalline phase depends on a helical pitch P in the cholesteric liquid crystalline phase and satisfies a relationship of "λ=n×helical pitch" with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the helical pitch increases.

That is, the helical pitch P corresponds to one pitch (helical period) of the helical structure of the cholesteric liquid crystalline phase. In other words, the helical pitch P refers to one helical winding, that is, the length in a helical axis direction in which a director of the liquid crystal compound constituting the cholesteric liquid crystalline phase rotates by 360° (refer to FIG. 3). For example, in the case of a rod-like liquid crystal compound, the director of the liquid crystal compound is a major axis direction.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the helical pitch can be found in "Fujifilm Research & Development" No. 50 (2005), p. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

In addition, the cholesteric liquid crystalline phase exhibits selective reflectivity with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

The turning direction of the cholesteric liquid crystalline phase can be adjusted by adjusting the kind of the liquid crystal compound that forms the cholesteric liquid crystal layer and/or the kind of the chiral agent to be added.

In addition, in a cross section of the cholesteric liquid crystal layer 28 observed with a scanning electron microscope (SEM), a stripe pattern in which bright portions 42 (bright lines) and dark portions 44 (dark lines) derived from a helical structure having a cholesteric liquid crystalline phase are alternately laminated in the thickness direction (the up-down direction in FIG. 2) is observed.

Basically, the interval (surface pitch P) of the bright portions 42 and the dark portions 44 depends on the helical pitch of the cholesteric liquid crystal layer.

Here, in the image display apparatus 10 according to the embodiment of the present invention, the cholesteric liquid crystal layer 28 has the pitch gradient structure in which the surface pitch P changes in the thickness direction, that is, in the up-down direction shown in FIG. 2 in a cross section observed with a SEM, the surface pitch being an interval of the bright portions and the dark portions derived from the cholesteric liquid crystalline phase.

In the example shown in the drawing, in the cholesteric liquid crystal layer 28, the surface pitch P gradually increases upward in the drawing. That is, in the cholesteric liquid crystal layer 28, a selective reflection center wavelength, that is, a wavelength range of light that is selectively reflected gradually increases upward.

In the following description, in the cholesteric liquid crystal layer, the pitch gradient structure in which the surface pitch P changes in the thickness direction will also be referred to as "PG structure".

In the image display apparatus 10 according to the embodiment of the present invention, in the PG structure of the cholesteric liquid crystal layer 28, the surface pitch P changes, for example, in the entire area of the thickness direction. Alternatively, in the image display apparatus 10 according to the embodiment of the present invention, in the PG structure of the cholesteric liquid crystal layer 28, the surface pitch P may change in a region other than a part on the upper side in the thickness direction or a part on the support 24 side. Alternatively, in the image display apparatus 10 according to the embodiment of the present invention, in the PG structure of the cholesteric liquid crystal layer 28, the surface pitch P may change in a region other than a part on the upper side in the thickness direction and a part on the support side. The upper side in the thickness direction is opposite to the support 24.

That is, in the image display apparatus 10 according to the embodiment of the present invention, the surface pitch P may change in any region in the thickness direction as long as the cholesteric liquid crystal layer 28 can exhibit selective reflectivity in a desired wavelength range.

In order to form the cholesteric liquid crystal layer having the PG structure, the chiral agent in which back isomerization, dimerization, isomerization, dimerization or the like occurs during light irradiation such that the helical twisting power (HTP) changes is used. By irradiating the liquid crystal composition with light having a wavelength at the HTP of the chiral agent changes before or during the curing of the liquid crystal composition for forming the cholesteric liquid crystal layer, the cholesteric liquid crystal layer having the PG structure can be formed.

For example, by using a chiral agent in which the HTP decreases during light irradiation, the HTP of the chiral agent decreases during light irradiation.

Here, the irradiated light is absorbed by a material for forming the cholesteric liquid crystal layer. Accordingly, for example, in a case where the light is irradiated from the upper side, that is, the side opposite to the support 24, the irradiation dose of the light gradually decreases from the upper side to the lower side. That is, the amount of decrease in the HTP of the chiral agent gradually decreases from above to below. Therefore, on the upper side where the decrease in HTP is large, the induction of helix is small, and thus the helical pitch is long. As a result, the surface pitch P increases. On the other hand, on the lower side where the decrease in HTP is small, helix is induced by the original HTP of the chiral agent, and thus the helical pitch decreases. As a result, the surface pitch P decreases.

That is, in this case, in the cholesteric liquid crystal layer, longer wavelength light is selectively reflected from the upper side, and shorter wavelength light is selectively reflected from the lower side. Accordingly, by using the cholesteric liquid crystal layer having the PG structure in which the helical pitch, that is, the surface pitch P changes in the thickness direction, light in a wide wavelength range can be selectively reflected.

In the cholesteric liquid crystal layer, a structure in which the bright portion 42 and the dark portion 44 are repeated twice corresponds to the helical pitch. Accordingly, in the cross section observed with a SEM, an interval between the bright portions 42 adjacent to each other or between the dark portions 44 adjacent to each other in a normal direction (vertical direction) of lines formed by the bright portions 42 or the dark portions 44 corresponds to a ½ pitch of the surface pitch P.

That is, the surface pitch P may be measured by setting the interval between the bright portions 42 or between the dark portions 44 in the normal direction with respect to the lines as a ½ pitch.

In the typical cholesteric liquid crystal layer in the example shown in the drawing, the surface pitch P matches a helical pitch corresponding to one helical structure pitch in the cholesteric liquid crystalline phase.

The thickness of the cholesteric liquid crystal layer 28 is not particularly limited and may be appropriately set depending on the use of the image display apparatus 10 and the like such that the cholesteric liquid crystal layer 28 can exhibit required reflectivity in a desired selective reflection wavelength range.

The thickness of the cholesteric liquid crystal layer 28 is preferably 0.1 to 50 μm, more preferably 0.2 to 30 μm, and still more preferably 0.3 to 20 μm.

In the image display apparatus 10 according to the embodiment of the present invention, the wavelength range of the light that is selectively reflected by the cholesteric liquid crystal layer 28 of the cholesteric liquid crystal element 18 is not particularly limited and may be appropriately set depending on the use of the image display apparatus and the like.

That is, the cholesteric liquid crystal layer 28 in the example shown in the drawing selectively reflects green light, but the present invention is not limited thereto. The cholesteric liquid crystal layer 28 may selectively reflect red light or may selectively reflect blue light.

The above-described cholesteric liquid crystal element 18 in the example shown in the drawing includes only one cholesteric liquid crystal layer 28, but the present invention is not limited thereto. That is, in the present invention, the cholesteric liquid crystal element 18 may include a plurality of cholesteric liquid crystal layers.

For example, the cholesteric liquid crystal element 18 may include two cholesteric liquid crystal layers including a cholesteric liquid crystal layer that selectively reflects red light and a cholesteric liquid crystal layer that selectively reflects green light. Alternatively, the cholesteric liquid crystal element 18 may include two cholesteric liquid crystal layers including a cholesteric liquid crystal layer that selectively reflects green light and a cholesteric liquid crystal layer that selectively reflects blue light. Further, the cholesteric liquid crystal element 18 may include three cholesteric liquid crystal layers including a cholesteric liquid crystal layer that selectively reflects red light, a cholesteric liquid crystal layer that selectively reflects green light, and a cholesteric liquid crystal layer that selectively reflects blue light.

In a case where the cholesteric liquid crystal element 18 includes a plurality of cholesteric liquid crystal layers having different selective reflection wavelength ranges, turning directions of circularly polarized light to be reflected from the respective cholesteric liquid crystal layers may be the same as or different from each other.

In addition, in a case where the cholesteric liquid crystal element 18 includes a plurality of cholesteric liquid crystal layers, at least one of the cholesteric liquid crystal layers only has to have the PG structure, but it is preferable that all of the cholesteric liquid crystal layers have the PG structure.

In a case where the cholesteric liquid crystal layer is formed on the cholesteric liquid crystal layer, the upper cholesteric liquid crystal layer follows the alignment state of the surface of the lower cholesteric liquid crystal layer.

Accordingly, in a case where the cholesteric liquid crystal element 18 includes a plurality of cholesteric liquid crystal layers, in a case where the lower cholesteric liquid crystal layer and the upper cholesteric liquid crystal layer may have the same alignment state, the alignment film 26 does not need to be provided for each of the cholesteric liquid crystal layers, and the cholesteric liquid crystal layer may be formed directly on the cholesteric liquid crystal layer.

In the case of a cholesteric liquid crystal layer described below having a liquid crystal alignment pattern in which a direction of an optical axis derived from the liquid crystal compound changes while continuously rotating in one in-plane direction, it is preferable that the length of the rotation period (the period of the diffraction structure) of the optical axis in the liquid crystal alignment pattern changes depending on the selective wavelength range of the cholesteric liquid crystal layer. Accordingly, in this case, it is preferable that the alignment film 26 is formed for each of the cholesteric liquid crystal layers.

In a case where the cholesteric liquid crystal element 18 includes a plurality of cholesteric liquid crystal layers, it is preferable that a display element that displays an image using two colors or a full color image using three colors is also used as the display element 12.

In other words, in a case where the display element 12 displays an image using two colors or a full color image using three colors, it is preferable that the cholesteric liquid crystal element 18 includes two or three cholesteric liquid crystal layers.

In the cholesteric liquid crystal element 18 shown in FIG. 2, in the PG structure of the cholesteric liquid crystal layer 28, the surface pitch P gradually increases upward. However, the present invention is not limited to this configuration.

That is, in the PG structure of the cholesteric liquid crystal layer 28, the surface pitch P may gradually increase toward the support 24.

As described above, the cholesteric liquid crystal layer 28 has the PG structure. As a result, a wider reflection wavelength range can be exhibited as compared to a typical cholesteric liquid crystal layer not having the PG structure.

In the image display apparatus according to the embodiment of the present invention, by using the cholesteric liquid crystal layer 28 having the PG structure, the utilization efficiency of the virtual image A displayed by the display element 12 can be improved, and the virtual image A having high brightness uniformity can be displayed over the entire display surface of the display element 12.

As is well known, in a case where light is incident into the cholesteric liquid crystal layer from a direction having an angle with respect to the normal line, so-called blue shift (short wavelength shift) in which the selective reflection wavelength range is shifted to a shorter wavelength side occurs.

The normal direction refers to a direction perpendicular to a main surface of a sheet-shaped material (a film, a plate-shaped material, or a layer). In addition, the main surface refers to the maximum surface of a sheet-shaped material.

Accordingly, in a case where light incident into the cholesteric liquid crystal layer from an oblique direction, even light in a wavelength that is originally reflected by the cholesteric liquid crystal layer according to the helical pitch is not reflected by the blue shift depending on the incidence angle with respect to the normal line.

In the image display apparatus such as AR glasses or a HUD that displays augmented reality in which the virtual image is superimposed on the real scene, the virtual image needs to be incident into the cholesteric liquid crystal layer from an oblique direction. Therefore, the image display apparatus that displays augmented reality using the cholesteric liquid crystal layer is largely affected by the blue shift.

In addition, in the image display apparatus that displays augmented reality using the cholesteric liquid crystal layer, in a case where the display element is a liquid crystal display, the incidence angle of light of the virtual image into the cholesteric liquid crystal layer varies depending on positions in a display screen. In addition, in the case of a display using light scanning, the incidence angle of light of the virtual image into the cholesteric liquid crystal layer varies depending on positions in a scanning direction.

Therefore, in the image display apparatus that displays the virtual image using the typical cholesteric liquid crystal layer as described in JP1996-136856A (JP-H8-136856A), the reflectivity partially decreases due to the blue shift of the cholesteric liquid crystal layer such that the brightness of the virtual image partially decreases.

On the other hand, in the image display apparatus 10 according to the embodiment of the present invention, the cholesteric liquid crystal layer 28 has the PG structure. Therefore, the selective reflection wavelength range of the cholesteric liquid crystal layer 28 is wide, and even in a case where blue shift occurs due to oblique incidence, the green virtual image A displayed (projected) by the display element 12 can be suitably reflected.

Therefore, in the image display apparatus 10 according to the embodiment of the present invention, as described below in detail, the virtual image A can be efficiently displayed using the cholesteric liquid crystal layer 28, and the virtual image A having high brightness uniformity can be displayed.

The reflection wavelength range of the cholesteric liquid crystal layer 28 is not particularly limited and is preferably 80 nm or more, more preferably 100 nm or more, still more preferably 150 nm or more, and still more preferably 200 nm or more.

By adjusting the selective reflection wavelength range of the cholesteric liquid crystal layer 28 to be 80 nm or more, the advantageous effect obtained by the above-described PG structure can be sufficiently exhibited, and the virtual image A having high brightness uniformity can be more stably displayed.

The selective reflection wavelength range of the cholesteric liquid crystal layer may be measured by disposing the cholesteric liquid crystal layer 28 oblique to the light source (display element 12) assuming the disposition in the image display apparatus and measuring light emitted from the light source and reflected by the cholesteric liquid crystal layer 28 using a spectrophotometer. For example, the cholesteric liquid crystal layer 28 may be disposed such that an angle between an emission direction of the light from the light source and the normal direction with respect to the main surface of the cholesteric liquid crystal layer is 45°.

<Liquid Crystal Composition>

The cholesteric liquid crystal layer 28 having the PG structure can be formed of a liquid crystal composition including a liquid crystal compound and a chiral agent.

(Liquid Crystal Compound)

It is preferable that the liquid crystal compound used for forming the cholesteric liquid crystal layer has two or more polymerizable groups. That is, it is preferable that the liquid crystal compound used for forming the cholesteric liquid crystal layer is a polymerizable liquid crystal compound. In addition, in the liquid crystal compound used for forming the cholesteric liquid crystal layer, an average molar absorption coefficient in 300 to 400 nm is preferably lower than 5000.

The liquid crystal compound may be a rod-like liquid crystal compound or a disk-like liquid crystal compound and is preferably a rod-like liquid crystal compound.

Examples of the rod-like liquid crystal compound for forming a cholesteric liquid crystal structure include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the liquid crystal compound is preferably 1 to 6 and more preferably 1 to 3 in one molecule.

Examples of the liquid crystal compound include compounds described in Makromol. Chem. (1989), Vol. 190, p. 2255, Advanced Materials (1993), Vol. 5, p. 107, US4683327A, U.S. Pat. Nos. 5,622,648A, 5,770,107A, WO1995/022586, WO1995/024455, WO1997/000600, WO1998/023580, WO1998/052905, WO2016/194327A, WO2016/052367A, JP1989-272551A (JP-H1-272551A), JP1994-016616A (JP-H6-016616A), JP1995-110469A (JP-H7-110469A), JP1999-080081A (JP-H11-80081A), and JP2001-328973A.

In the liquid crystal composition, that is, the cholesteric liquid crystal layer, two or more liquid crystal compounds may be used in combination. In a case where two or more liquid crystal compounds are used in combination, there may be a case where the alignment temperature can be decreased.

In addition, the addition amount of the liquid crystal compound in the liquid crystal composition is not particularly limited and is preferably 80 to 99.9 mass %, more preferably 85 to 99.5 mass %, and still more preferably 90 to 99 mass % with respect to the solid content mass (mass excluding a solvent) of the liquid crystal composition.

(Chiral Agent: Optically Active Compound)

As the chiral agent used for forming the cholesteric liquid crystal layer, any well-known chiral agents can be used as long as the HTP thereof changes by light irradiation. In particular, a chiral agent having a molar absorption coefficient of 30000 or higher at a wavelength of 313 nm is preferably used.

The chiral agent has a function of causing a helical structure of a cholesteric liquid crystalline phase to be formed. The chiral compound may be selected depending on the purpose because a helical sense or a helical pitch induced from the compound varies.

As the chiral agent, a well-known compound can be used, but a compound having a cinnamoyl group is preferable. Examples of the chiral agent include compounds described in Liquid Crystal Device Handbook (No. 142 Committee of Japan Society for the Promotion of Science, 1989), Chapter 3, Article 4-3, chiral agent for TN or STN, p. 199), JP2003-287623A, JP2002-302487A, JP2002-080478A, JP2002-080851A, JP2010-181852A, and JP2014-034581A.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group.

In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC-756 (manufactured by BASF SE) may be used.

The content of the chiral agent in the liquid crystal composition is preferably 0.01 to 200 mol % and more preferably 1 to 30 mol % with respect to the amount of the liquid crystal compound.

(Polymerization Initiator)

It is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), an acylphosphine oxide compound (described in JP1988-040799B (JP-S63-040799B), JP1993-029234B (JP-H5-

029234B), JP1998-095788A (JP-H10-095788A), JP1998-029997A (JP-H10-029997A), JP2001-233842A, JP2000-080068A, JP2006-342166A, JP2013-114249A, JP2014-137466A, JP4223071B, JP2010-262028A, and JP2014-500852A), an oxime compound (described in JP2000-066385A and Japanese Patent No. 4454067), and an oxadiazole compound (described in U.S. Pat. No. 4,212,970A). The details of the polymerization initiator can also be found in, for example, the description of paragraphs "0500" to "0547" of JP2012-208494A.

Examples of the polymerization initiator that can be used include an acylphosphine oxide compound and an oxime compound.

As the acylphosphine oxide compound, for example, IRGACURE 810 (manufactured by BASF SE, compound name: bis(2,4,6-trimethylbenzoyl)-phenylphosphine oxide) as a commercially available product can be used. As the oxime compound, for example, a commercially available product such as IRGACURE OXE01 (manufactured by BASF SE), IRGACURE OXE02 (manufactured by BASF SE), TR-PBG-304 (manufactured by Changzhou Tronly New Electronic Materials Co., Ltd.), ADEKA ARKLS NCI-831 and ADEKA ARKLS NCI-930 (manufactured by Adeka Corporation), ADEKA ARKLS NCI-831 (manufactured by Adeka Corporation) can be used.

The polymerization initiators may be used alone or in combination of two or more kinds.

In a case where light irradiation for curing the cholesteric liquid crystal layer 28 is performed to form the reflective layer after performing light irradiation for changing the HTP of the chiral agent, it is preferable to use a photopolymerization initiator that inhibits polymerization during the light irradiation for changing the HTP of the chiral agent. In this case, the content of the photopolymerization initiator in the liquid crystal composition is preferably 0.05 to 3 mass % and more preferably 0.3 to 1.5 mass % with respect to the content of the liquid crystal compound. In addition, the light irradiation for changing the HTP of the chiral agent and the light irradiation for curing the cholesteric liquid crystal layer 28 are performed at the same time, the content of the photopolymerization initiator in the liquid crystal composition is preferably 0.01% to 0.3 mass % and more preferably 0.01% to 0.2 mass % with respect to the content of the liquid crystal compound.

(Crosslinking Agent)

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The kind of the crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl) propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane.

In addition, depending on the reactivity of the crosslinking agent, a well-known catalyst can be used, and not only film hardness and durability but also productivity can be improved. These catalysts may be used alone or in combination of two or more kinds.

The content of the crosslinking agent in the liquid crystal composition is preferably 3 to 20 mass % and more preferably 5 to 15 mass % with respect to the solid content of the liquid crystal composition.

(Alignment Control Agent)

An alignment control agent contributing to the stable or rapid formation of a cholesteric liquid crystal structure with planar alignment may be added to the liquid crystal composition.

Examples of the alignment control agent include fluorine (meth)acrylate polymers described in paragraphs "0018" to "0043" of JP2007-272185A, and compounds represented by Formulae (I) to (IV) described in paragraphs "0031" to "0034" of JP2012-203237A.

The alignment control agents may be used alone or in combination of two or more kinds.

The addition amount of the alignment control agent in the liquid crystal composition is preferably 0.01 to 10 mass %, more preferably 0.01 to 5 mass %, and still more preferably 0.02 to 1 mass % with respect to the total mass of the liquid crystal compound.

(Surfactant)

The liquid crystal composition may include a surfactant.

It is preferable that the surfactant is a compound which can function as an alignment control agent contributing to the stable or rapid formation of a cholesteric structure with planar alignment. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

(Other Additives)

In addition, the liquid crystal composition may include at least one selected from various additives such as a polymerizable monomer. In addition, optionally, a polymerization inhibitor, an antioxidant, an ultraviolet absorber, a light stabilizer, a coloring material, metal oxide fine particles or the like can be added to the liquid crystal composition in a range where optical performance does not deteriorate.

(Solvent)

The solvent used for preparing the liquid crystal composition is not particularly limited and may be appropriately selected depending on the liquid crystal compound to be added to the composition and the like.

As a solvent, an organic solvent is preferably used. The organic solvent is not particularly limited and can be appropriately selected depending on the liquid crystal compound to be added to the composition and the like. Examples of the organic solvent include a ketone, an alkyl halide, an amide, a sulfoxide, a heterocyclic compound, a hydrocarbon, an ester, and an ether. Among these, a ketone is preferable in consideration of an environmental burden.

These solvents may be used alone or in combination of two or more kinds.

<Formation of Cholesteric Liquid Crystal Layer>

The cholesteric liquid crystal layer 28 can be formed by dissolving the liquid crystal compound, the chiral agent, and the polymerization initiator and further the optionally added surfactant or the like in a solvent to prepare a liquid crystal composition, applying the liquid crystal composition to the alignment film 26, drying the liquid crystal composition to obtain a coating film, and irradiating the coating film with an actinic ray to cure the liquid crystal composition. As a result, the cholesteric liquid crystal layer 28 having a cholesteric liquid crystal structure in which cholesteric regularity is immobilized can be formed.

In addition, by performing light irradiation for changing the HTP of the chiral agent before or during the curing of the liquid crystal composition, the cholesteric liquid crystal layer 28 having the PG structure can be formed.

The structure in which a cholesteric liquid crystalline phase is immobilized may be a structure in which the alignment of the liquid crystal compound as a liquid crystal phase is immobilized. Typically, it is preferable that the structure in which a predetermined liquid crystal phase is immobilized is a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

(Application and Alignment)

A method of applying the liquid crystal composition is not particularly limited and may be appropriately selected depending on properties of the coating composition, the materials for forming the alignment film 26 and the support 24, and the like.

Examples of the method of applying the liquid crystal composition include a wire bar coating method, a curtain coating method, an extrusion coating method, a direct gravure coating method, a reverse gravure coating method, a die coating method, a spin coating method, a dip coating method, a spray coating method, and a slide coating method.

In addition, the liquid crystal composition may be applied to the alignment film 26 (cholesteric liquid crystal layer 28) by transferring the liquid crystal composition that is separately applied to the support. In addition, droplets of the liquid crystal composition can also be jetted. Examples of the jetting method include an ink jet method.

By heating the applied liquid crystal composition, liquid crystal molecules are aligned. The heating temperature is preferably 200° C. or lower and more preferably 130° C. or lower. Through the alignment treatment, a structure in which the liquid crystal compound is twisted and aligned to have a helical axis can be obtained.

(Curing of Liquid Crystal Composition)

Next, by polymerizing the aligned liquid crystal compound, the liquid crystal composition can be cured to form the cholesteric liquid crystal layer 28. Regarding the polymerization of the polyfunctional liquid crystal compound, thermal polymerization or photopolymerization may be performed, and photopolymerization is preferable.

It is preferable that light irradiation for curing the liquid crystal composition is performed by ultraviolet irradiation. The illuminance of ultraviolet light is preferably 15 to 1500 mW/cm$^2$ and more preferably 100 to 600 mW/cm$^2$. In addition, the irradiation energy of ultraviolet light is preferably 20 mJ/cm$^2$ to 50 J/cm$^2$ and more preferably 100 to 1500 mJ/cm$^2$.

A wavelength of ultraviolet light to be irradiated may be appropriately selected depending on the liquid crystal compound in the liquid crystal composition and the like. In order to cure the liquid crystal composition, a light source having an emission wavelength of 200 to 430 nm is preferable, and a light source having an emission wavelength of 300 to 430 nm is more preferable. In addition, during ultraviolet irradiation, from the viewpoint of preventing a decomposition, side reaction, or the like of a material to be used, for example, a short wavelength cut filter may be used to suppress the transmittance of light having a wavelength of 300 nm or shorter to be 20% or less.

In a case where the cholesteric liquid crystal layer 28 having the PG structure is formed, light irradiation for changing the HTP of the chiral agent is performed before the curing of the liquid crystal composition. Alternatively, in a case where the cholesteric liquid crystal layer 28 having the PG structure is formed, light irradiation for changing the HTP of the chiral agent and light irradiation for curing the liquid crystal composition may be performed at the same time.

Here, as described above, the PG structure can be obtained by irradiating the chiral agent with light having a wavelength that is absorbed by the chiral agent during the formation of the cholesteric liquid crystal layer 28 such that the irradiation dose of light in the thickness direction, that is, the amount of change in HTP changes. Accordingly, as a difference in the irradiation dose of the light during the formation of the cholesteric liquid crystal layer increases in the thickness direction, the selective reflection wavelength range can be widened.

During the formation of the cholesteric liquid crystal layer 28, in order to promote the change of the HTP of the chiral agent, ultraviolet irradiation may be performed after heating. During the ultraviolet irradiation for promoting the change of the HTP of the chiral agent, the oxygen concentration is not particularly limited. Accordingly, the ultraviolet irradiation may be performed in an oxygen atmosphere or in a low oxygen atmosphere. Further, it is preferable that the ultraviolet irradiation for promoting the photopolymerization reaction of the liquid crystal compound is performed under heating and/or in a low oxygen atmosphere.

In order to prevent the cholesteric liquid crystal layer from being disordered, it is preferable that the temperature during the ultraviolet irradiation is maintained in a temperature range where the cholesteric liquid crystalline phase is exhibited. Specifically, the temperature during the ultraviolet irradiation is preferably 25° C. to 140° C. and more preferably 30° C. to 100° C.

In addition, the low oxygen atmosphere during the ultraviolet irradiation may be formed by reducing the oxygen concentration in the atmosphere using a well-known method such as nitrogen substitution. The oxygen concentration is preferably 5000 ppm or lower, more preferably 100 ppm or lower, and still more preferably 50 ppm or lower.

From the viewpoint of stability, the polymerization degree after curing the liquid crystal composition is preferably high, and is preferably 50% or higher and more preferably 60% or higher. The polymerization degree can be determined by measuring a consumption ratio between polymerizable functional groups using an IR absorption spectrum.

[Curved Half Mirror]

The virtual image A reflected by the cholesteric liquid crystal element 18 (cholesteric liquid crystal layer 28) is incident into the curved half mirror 20. The curved half mirror 20 is the transparent reflection element according to the embodiment of the present invention.

The curved half mirror 20 focuses the virtual image A reflected by the cholesteric liquid crystal element 18 (cholesteric liquid crystal layer 28) and reflects the focused virtual image A to the cholesteric liquid crystal layer 28 to be emitted to the observation position by the user U. In addition, the real scene R transmits through the curved half mirror 20 and the cholesteric liquid crystal element 18 and reaches the observation position by the user U.

As a result, the user U can observe augmented reality where the virtual image A is superimposed on the real scene R.

In the example shown in the drawing, in a preferable aspect, the curved half mirror 20 has a reflecting lens function of focusing and reflecting the virtual image A. However, the present invention is not limited to this configuration, and a typical half mirror may be used instead of the curved half mirror 20.

As the curved half mirror 20 and the half mirror, various well-known half mirrors can be used.

In the image display apparatus 10, in order to increase the brightness of the virtual image A, the reflectivity of the curved half mirror 20 may be increased. Conversely, in order to increase the brightness of the real scene R, the reflectivity of the curved half mirror 20 may be reduced.

Although described below, in the image display apparatus 10 according to the embodiment of the present invention, the cholesteric liquid crystal layer 28 is used. Therefore, the utilization efficiency of the virtual image A displayed by the display element 12 is high. Accordingly, even in a case where the reflectivity of the curved half mirror 20 is reduced to increase the brightness of the real scene, the user U can observe the virtual image A having sufficient brightness.

In the image display apparatus 10 according to the embodiment of the present invention, the transparent reflection element is not limited to the curved half mirror and the half mirror, and a diffraction element can also be used.

In addition, as the transparent reflection element, a cholesteric liquid crystal layer that has a liquid crystal alignment pattern described below and acts as a reflective diffraction element can also be used. The transparent reflection element including the cholesteric liquid crystal layer will be described below in detail.

[Action of Image Display Apparatus]

Hereinafter, the present invention will be described in more detail by describing the action of the image display apparatus 10.

As described above, the display element 12 of the image display apparatus 10 displays (projects) an image of right circularly polarized light of green light as the virtual image A.

The virtual image A of linearly polarized light displayed by the display element 12 is focused by the lens 14 and is converted into right circularly polarized light by the retardation plate 16.

The virtual image A of right circularly polarized light that is converted by the retardation plate 16 is reflected to the curved half mirror 20 by the cholesteric liquid crystal layer 28 of the cholesteric liquid crystal element 18.

The virtual image A of right circularly polarized light incident into the curved half mirror 20 is focused by the curved half mirror 20 and is reflected to return to the cholesteric liquid crystal element 18. Due to this reflection, the virtual image A of right circularly polarized light is converted into left circularly polarized light.

The virtual image A of left circularly polarized light is incident into the cholesteric liquid crystal element 18. Here, the cholesteric liquid crystal layer 28 of the cholesteric liquid crystal element 18 selectively reflects green right circularly polarized light and allow transmission of the other light.

Accordingly, the virtual image A of left circularly polarized light is not reflected by the cholesteric liquid crystal layer 28 and transmits through the cholesteric liquid crystal element 18 to be emitted to the observation position by the user U.

On the other hand, in the image display apparatus 10, the real scene R transmits through the curved half mirror 20, and components other than the right circularly polarized light of green light that is selectively reflected by the cholesteric liquid crystal layer 28 transmit through the cholesteric liquid crystal element 18 to be observed by the user U.

As a result, the user U of the image display apparatus 10 observes augmented reality where the virtual image A is superimposed on the real scene R.

Figure 12:
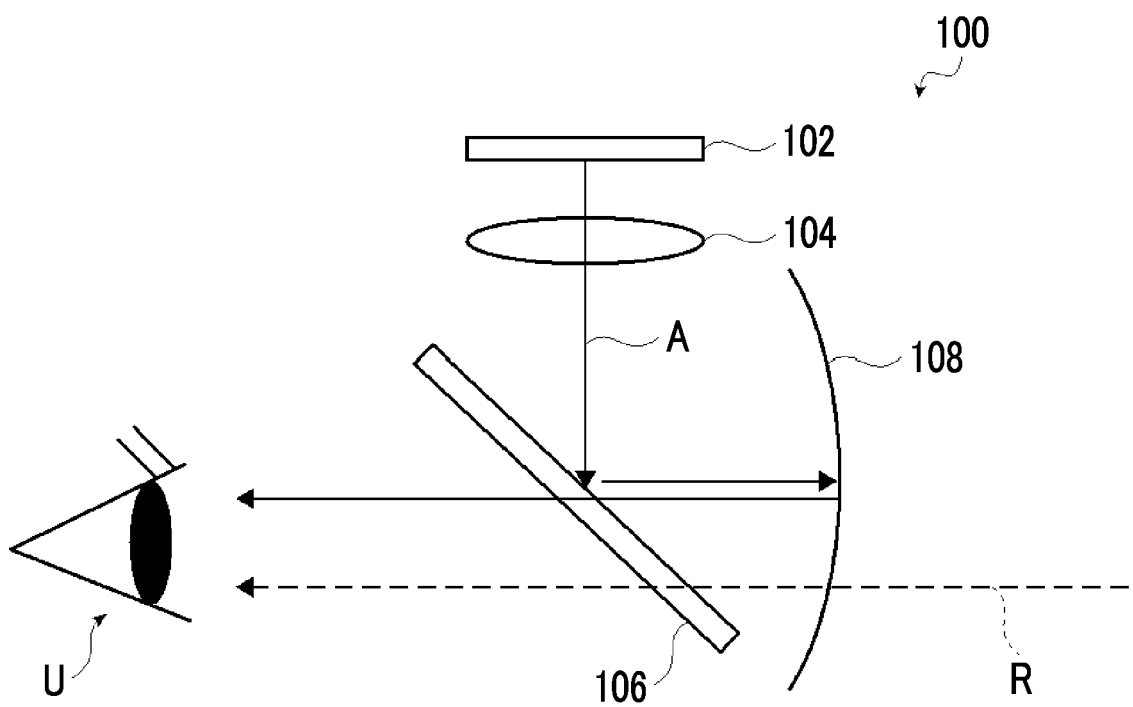
FIG. 12 is a diagram conceptually showing an example of an image display apparatus in the related art.

As described above, in the image display apparatus 100 in the related art shown in FIG. 12, the virtual image A displayed by the display element 102 is reduced by half in light amount during reflection by the beam splitter 106. Further, in a case where the virtual image A is reflected by the curved half mirror 108 and transmits through the beam splitter 106, the light amount is further reduced by half. Further, the light amount of the virtual image A is reduced by half by the curved half mirror 108.

On the other hand, in the image display apparatus 10 according to the embodiment of the present invention, ideally, the reduction in the light amount of the virtual image A by the cholesteric liquid crystal element 18 can be substantially cancelled out. Therefore, in the image display apparatus 10 according to the embodiment of the present invention, the utilization efficiency of the virtual image A displayed by the display element 12 can be significantly improved. As a result, for example, the transmittance of the curved half mirror 20 is improved, and even in a case where the brightness of the real scene R is high, the virtual image A having sufficient brightness can be displayed. Further, in the image display apparatus 10 according to the embodiment of the present invention, the cholesteric liquid crystal layer 28 has the PG structure. Therefore, even in a case where the blue shift occurs in the cholesteric liquid crystal layer 28 due to oblique incidence of the virtual image A, as described above, the virtual image A displayed by the display element 12 can be suitably reflected, and the virtual image A having high brightness uniformity can be displayed.

[Another Example of Cholesteric Liquid Crystal Layer]

Figure 3:
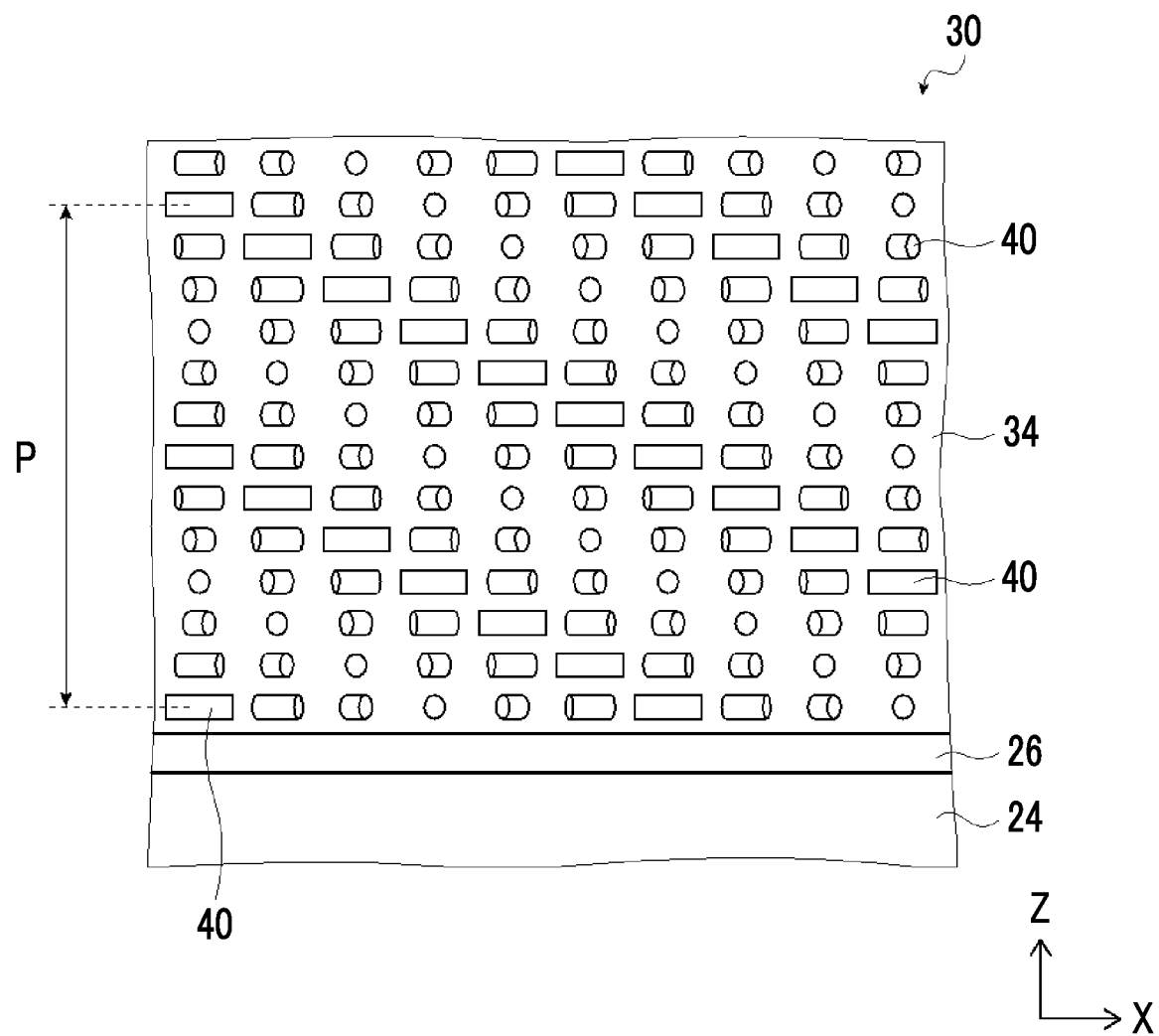
FIG. 3 is a diagram conceptually showing another example of the cholesteric liquid crystal element.

FIG. 3 conceptually shows another example of the cholesteric liquid crystal layer that can be used in the image display apparatus 10 according to the embodiment of the present invention.

The cholesteric liquid crystal layer 28 shown in FIG. 2 has the same configuration as the typical cholesteric liquid crystal layer except that it has the PG structure, and selectively reflects the incident light in the selective reflection wavelength range.

On the other hand, a cholesteric liquid crystal layer 34 of a cholesteric liquid crystal element 30 shown in FIG. 3 is a cholesteric liquid crystal layer having the PG structure and a predetermined liquid crystal alignment pattern. The predetermined liquid crystal layer is a liquid crystal alignment pattern in which a direction of an optical axis derived from the liquid crystal compound changes while continuously rotating in at least one in-plane direction, In a preferable aspect, in a case where light is incident from a direction (for example, 60°) tilted with respect to the normal line, the selective reflection wavelength range of the cholesteric liquid crystal layer 34 is 80 nm or longer.

In addition, the cholesteric liquid crystal element 30 shown in FIG. 3 includes the support 24 and the alignment film 26 as in the cholesteric liquid crystal layer 28 shown in FIG. 2, and further includes the cholesteric liquid crystal layer 34 that is formed on the alignment film 26.

The cholesteric liquid crystal layer 34 does not selectively reflect the incident light in the selective reflection wavelength range and diffracts and reflects the incident light in a direction different from that of specular reflection. For example, in a case where light is incident from the normal direction, the light is not reflected to return to the normal direction and is reflected in a direction having an angle with respect to the normal line. That is, the cholesteric liquid crystal layer 34 is a reflective diffraction element (reflective liquid crystal diffraction element).

Hereinafter, the cholesteric liquid crystal layer 34 will be described using not only FIG. 3 but also FIGS. 4 and 5. As described above, the cholesteric liquid crystal layer 34 has the PG structure. Accordingly, the surface pitch P (tilted surface pitch P) gradually increases, for example, upward, that is, in a direction away from the support 24.

In the following description, it is assumed that a main surface of the cholesteric liquid crystal layer 34 is an X-Y plane and a cross-section perpendicular to the X-Y plane is a X-Z plane. That is, FIG. 3 corresponds to a schematic diagram of the X-Z plane of the cholesteric liquid crystal layer 34, and FIG. 4 corresponds to a schematic diagram of the X-Y plane of the cholesteric liquid crystal layer 34.

Figure 4:
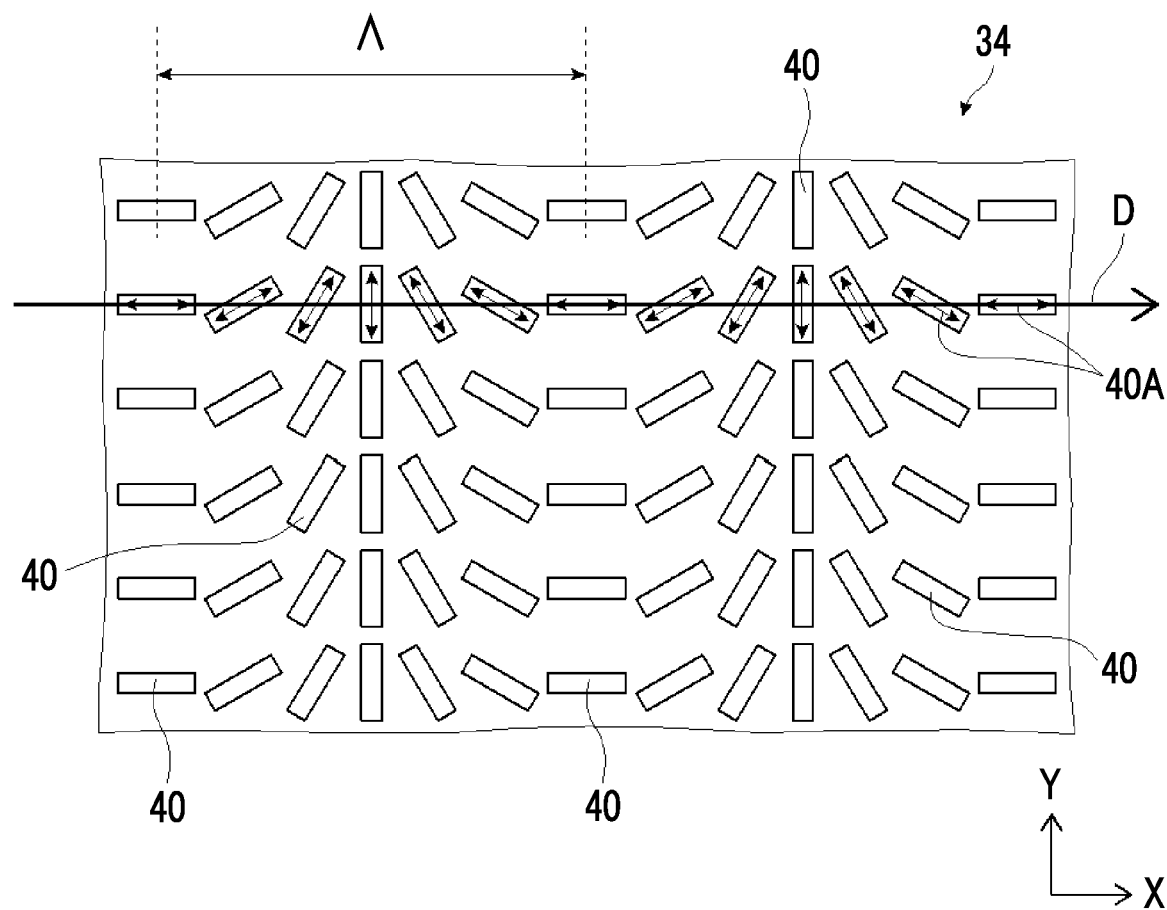
FIG. 4 is a plan view conceptually showing the cholesteric liquid crystal layer shown in FIG. 3.
Figure 5:
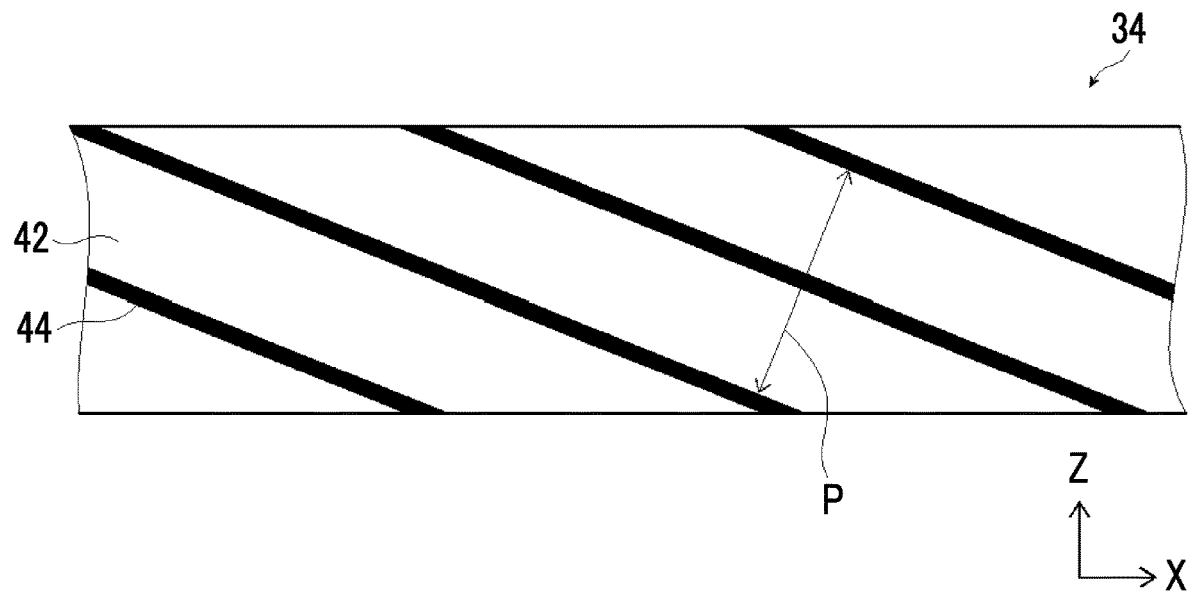
FIG. 5 is a diagram conceptually showing a scanning electron microscope image of a cross section of the cholesteric liquid crystal layer shown in FIG. 3.

As conceptually shown in FIGS. 3 to 5, the cholesteric liquid crystal layer 34 is also a layer obtained by cholesteric alignment of a liquid crystal compound. In addition, FIGS. 3 to 5 show an example in which the liquid crystal compound forming the cholesteric liquid crystal layer is a rod-like liquid crystal compound.

As shown in FIG. 4, in the X-Y plane of the cholesteric liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 4, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the cholesteric liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 4, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal alignment pattern of the cholesteric liquid crystal layer 34, the single period Λ is repeated in the arrangement axis D direction, that is, in the one in-plane direction in which the direction of the optical axis 40A changes while continuously rotating. In the cholesteric liquid crystal element 30, the single period Λ is the period of the diffraction structure in the diffraction element.

On the other hand, in the liquid crystal compound 40 forming the cholesteric liquid crystal layer 34, the directions of the optical axes 40A are the same in the direction (in FIG. 4, the Y direction) perpendicular to the arrangement axis D direction, that is, the Y direction perpendicular to the one in-plane direction in which the optical axis 40A continuously rotates.

In other words, in the liquid crystal compound 40 forming the cholesteric liquid crystal layer 34, angles between the optical axes 40A of the liquid crystal compound 40 and the arrangement axis D (X direction) are the same in the Y direction.

In a case where the X-Z plane of the cholesteric liquid crystal layer 34 shown in FIG. 3 is observed with a SEM, an arrangement direction in which bright portions 42 and dark portions 44 are alternately arranged as shown in FIG. 5, a stripe pattern tilted at a predetermined angle with respect to the main surface (X-Y plane) is observed. In the SEM cross section, in the stripe pattern tilted at a predetermined angle, an interval between the bright portions 42 adjacent to each other or between the dark portions 44 adjacent to each other in a normal direction (vertical direction) of lines formed by the bright portions 42 or the dark portions 44 corresponds to ½ of the surface pitch P.

That is, in the configuration in which the bright portions 42 and the dark portions 44 are tilted with respect to the main surface as shown in FIGS. 3 to 5, the surface pitch P (tilted surface pitch P) may be measured by setting the interval between the bright portions 42 adjacent to each other or between the dark portions 44 adjacent to each other in the normal direction with respect to the lines as a ½ pitch.

In the cholesteric liquid crystal element 30, in order to form the cholesteric liquid crystal layer 34 having the liquid crystal alignment pattern, the alignment film 26 needs to have the alignment pattern corresponding to the liquid crystal alignment pattern.

Examples of a method of forming the alignment film 26 having the alignment pattern include a method including: applying the above-described photo-alignment material used as the alignment film 26 to a surface of the support 24; drying the applied alignment film 26; and exposing the alignment film 26 to laser light to form an alignment pattern.

Figure 9:
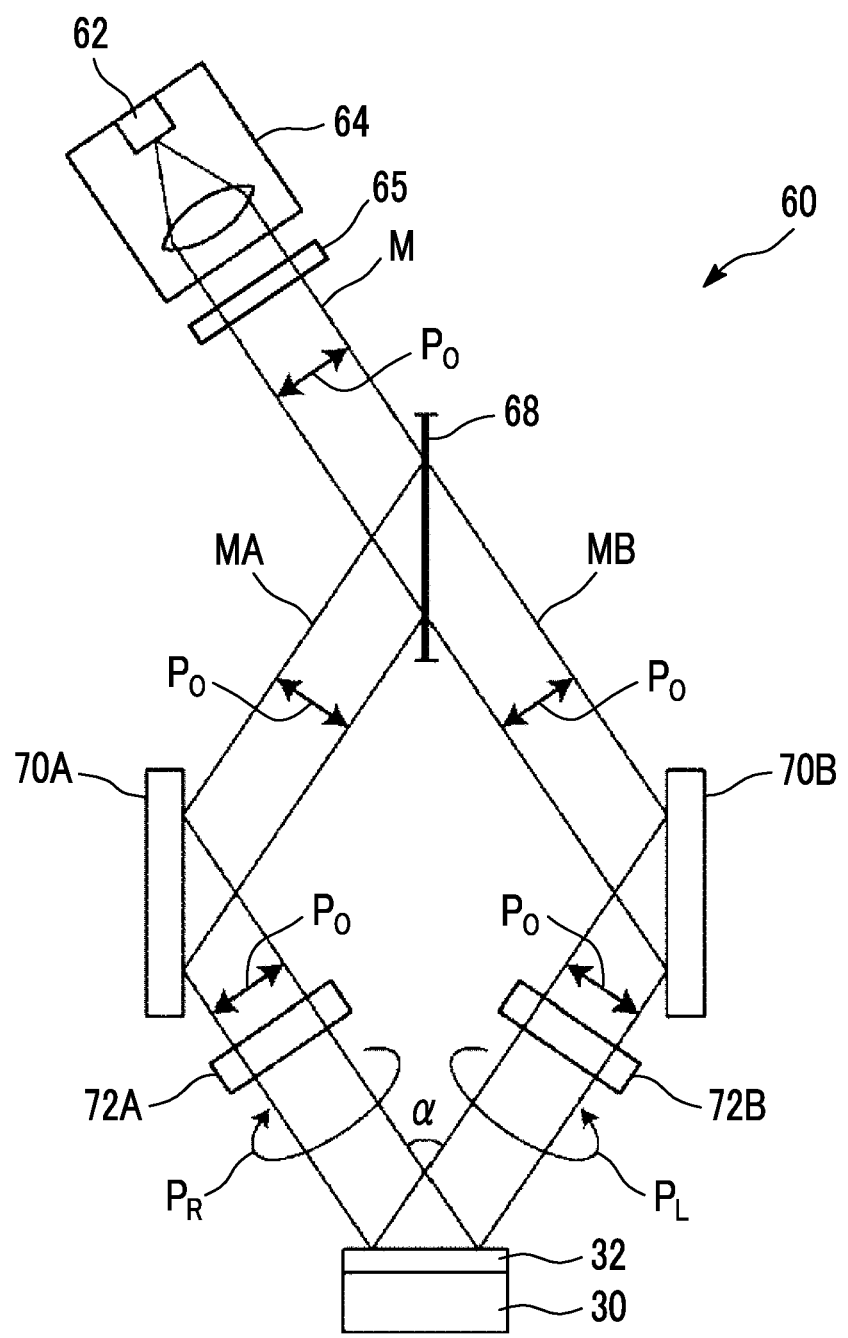
FIG. 9 is a diagram conceptually showing an example of an exposure device that exposes an alignment film.

FIG. 9 conceptually shows an example of an exposure device that exposes the alignment film 26 to form an alignment pattern.

An exposure device 60 shown in FIG. 9 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 24 including the alignment film 26 on which the alignment pattern is not yet formed is disposed at an exposed portion, the two beams MA and MB intersect and interfere with each other on the alignment film 26, and the alignment film 26 is irradiated with and exposed to the interference light.

Due to the interference in this case, the polarized state of light with which the alignment film 26 is irradiated periodically changes according to interference fringes. As a result, an alignment film having an alignment pattern in which the alignment state periodically changes can be obtained. In the following description, this alignment film having the alignment pattern will also be referred to as "patterned alignment film".

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 26 having the alignment pattern in which the alignment state periodically changes, as described below, the cholesteric liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound 40 is aligned such that the direction of the optical axis 40A of the liquid crystal compound 40 in the cholesteric liquid crystal layer formed on the patterned alignment film changes while continuously rotating in at least one in-plane direction.

In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

Hereinafter, an effect of diffraction by the cholesteric liquid crystal layer 34 having the liquid crystal alignment pattern will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane) as shown in FIG. 2.

The cholesteric liquid crystalline phase has specular reflectivity. Therefore, in a case where light is incident from the normal direction into the cholesteric liquid crystal layer, the light is reflected in the normal direction.

Figure 6:
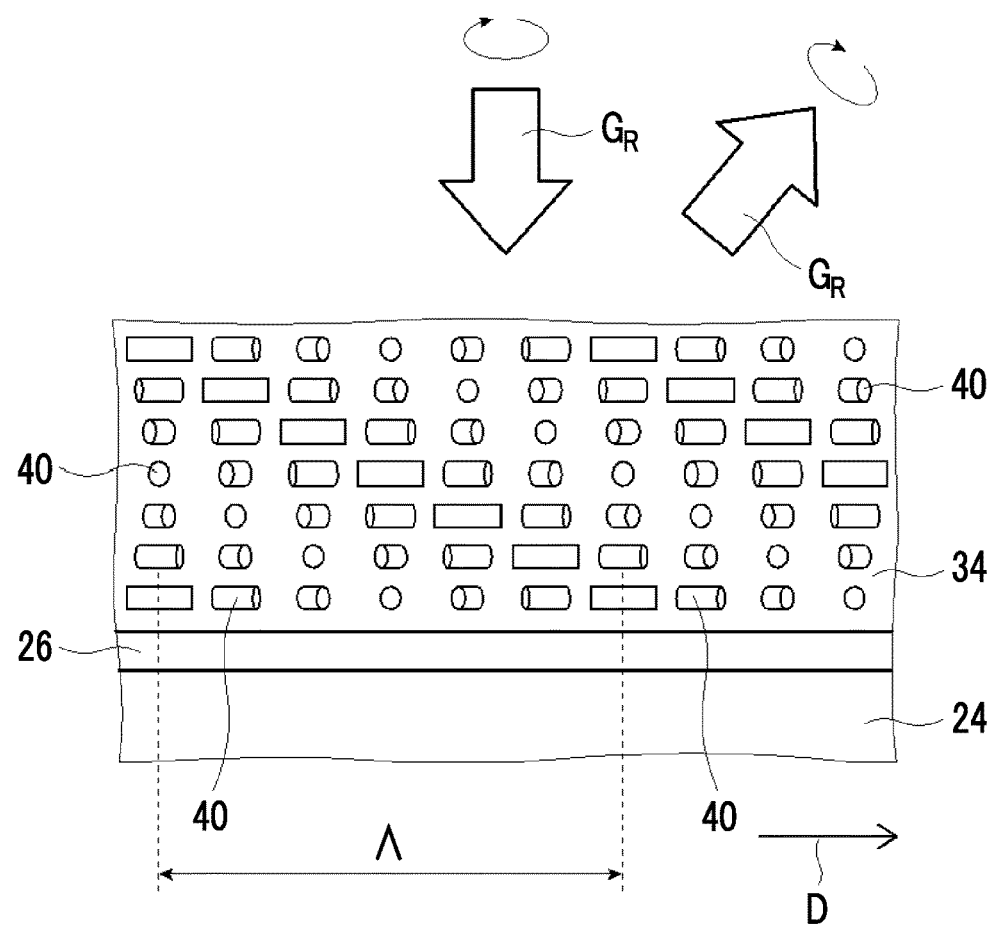
FIG. 6 is a conceptual diagram showing an action of the cholesteric liquid crystal layer shown in FIG. 3.

On the other hand, the cholesteric liquid crystal layer 34 reflects incident light in a state where it is tilted in the arrangement axis D direction with respect to the specular reflection. The cholesteric liquid crystal layer 34 has the liquid crystal alignment pattern in which the optical axis 40A changes while continuously rotating in the arrangement axis D direction in a plane (the predetermined one in-plane direction). Hereinafter, the description will be made with reference to the conceptual diagram of FIG. 6.

For example, as described above, the cholesteric liquid crystal layer 34 selectively reflects right circularly polarized light $G_R$ of green light. Accordingly, in a case where light is incident into the cholesteric liquid crystal layer 34, the cholesteric liquid crystal layer 34 reflects only right circularly polarized light $G_R$ of green light and allows transmission of the other light.

Here, in the cholesteric liquid crystal layer 34, the optical axis 40A of the liquid crystal compound 40 changes while rotating in the arrangement axis D direction (the one in-plane direction).

In addition, the liquid crystal alignment pattern formed in the cholesteric liquid crystal layer 34 is a pattern that is periodic in the arrangement axis D direction. Therefore, as conceptually shown in FIG. 6, the right circularly polarized light $G_R$ of green light incident into the cholesteric liquid crystal layer 34 is reflected (diffracted) in a direction corresponding to the period of the liquid crystal alignment pattern, and the reflected right circularly polarized light $G_R$ of green light is reflected (diffracted) in a direction tilted with respect to the XY plane (the main surface of the cholesteric liquid crystal layer) in the arrangement axis D direction.

As a result, as described below, by using the cholesteric liquid crystal element 30 including the cholesteric liquid crystal layer 34, the disposition space of the cholesteric liquid crystal element 30 can be significantly reduced, and a reduction in the size (thickness) of the image display apparatus 10 can be realized.

In the cholesteric liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 3 and 4, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the cholesteric liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

Accordingly, in the cholesteric liquid crystal layer 34 of the cholesteric liquid crystal element 30, depending on the turning direction of circularly polarized light to be selectively reflected, that is, the helical turning direction, the arrangement axis D direction and the rotation direction of the optical axis 40A in the liquid crystal alignment pattern are set such that incident light is appropriately directed to the curved half mirror 20.

The cholesteric liquid crystal layer 28 not having the liquid crystal alignment pattern shown in FIG. 2 reflects incident light by specular reflection. Therefore, in order to make the virtual image A to be incident into the curved half mirror 20, the cholesteric liquid crystal element 18 including the cholesteric liquid crystal layer needs to be disposed at an angle of 45° with respect to the incidence direction of the virtual image A from the display element 12 as shown in FIG. 1. That is, the cholesteric liquid crystal element 18 needs to be disposed such that an angle of the normal line with respect to the incidence direction and the reflection direction of light is 45°.

On the other hand, the cholesteric liquid crystal layer 34 as a reflective diffraction element can diffract and reflect incidence light. Therefore, as in an image display apparatus 10A conceptually shown in FIG. 10, the angle between the normal line of the cholesteric liquid crystal element 18 and the incidence direction of the virtual image A can be made to be more than 45°. The incidence direction of the virtual image A is typically a direction of the optical axis of the lens 14.

Figure 10:
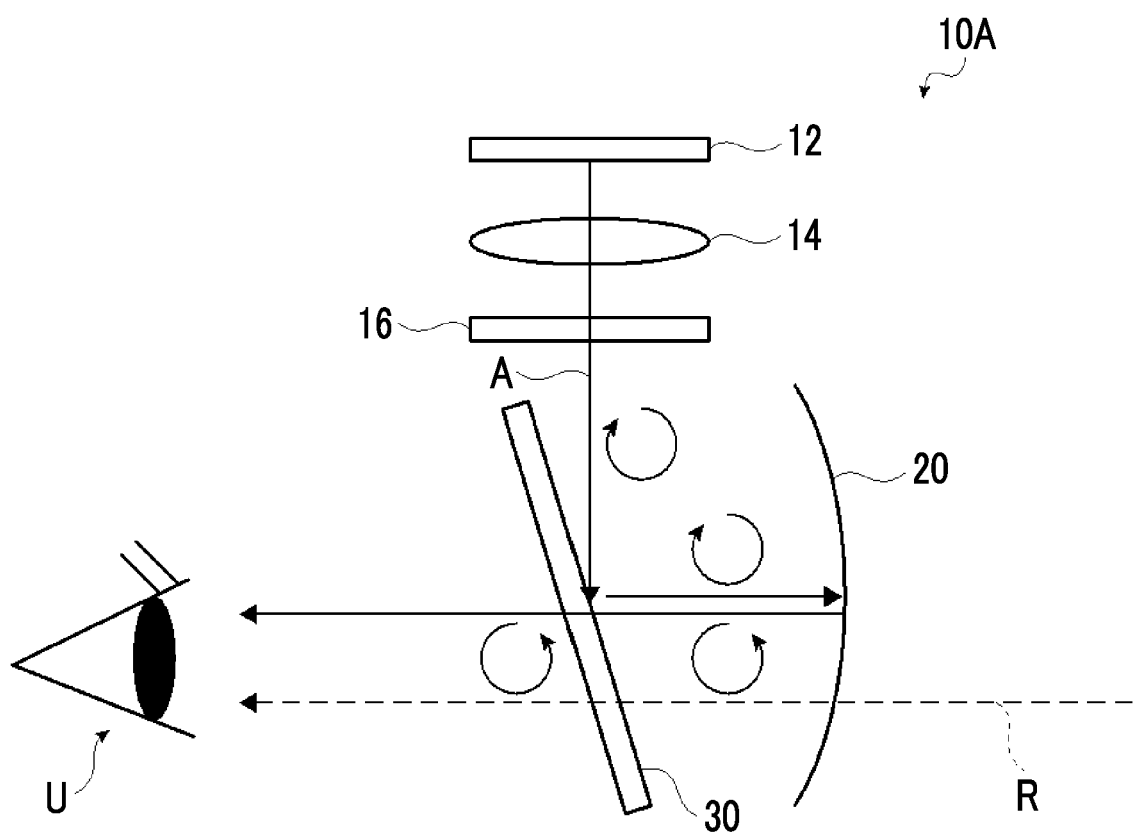
FIG. 10 is a diagram conceptually showing another example of the image display apparatus according to the present invention.

As a result, as shown in FIG. 10, the space required for disposing the cholesteric liquid crystal element 18 can be significantly reduced, and a reduction in the size (thickness) of the image display apparatus 10A can be realized.

In the example shown in FIG. 2, the cholesteric liquid crystal element 18 is disposed such that the normal direction of the display element 12 and the direction of the optical axis of the lens 14 are perpendicular to the optical axis direction of the curved half mirror 20. Therefore, the cholesteric liquid crystal layer 28 (cholesteric liquid crystal element 18) not having the liquid crystal alignment pattern is disposed such that the angle of the normal line with respect to the incidence direction and reflection direction of light is 45°. In a case where the cholesteric liquid crystal layer 28 is disposed such that the normal direction of the display element 12 and the direction of the optical axis of the lens 14 are tilted to intersect the optical axis direction of the curved half mirror 20, the cholesteric liquid crystal layer 28 not having the liquid crystal alignment pattern may be disposed such that the angle of the normal line with respect to the incidence direction and reflection direction of light is an angle other than 45°. Even in this case, by using the cholesteric liquid crystal layer 34 as a reflective diffraction element, the space required for disposing the cholesteric liquid crystal element 18 can be reduced, and a reduction in the size (thickness) of the image display apparatus 10A can be realized.

The cholesteric liquid crystal layer 34 (cholesteric liquid crystal element 18) having the liquid crystal alignment pattern functions as a reflective diffraction element as described above.

In the cholesteric liquid crystal layer 34 having the liquid crystal alignment pattern, the single period Λ as the length over which the optical axis 40A of the liquid crystal compound 40 rotates by 180° is the period (single period) of the diffraction structure as the diffraction element. In addition, in the cholesteric liquid crystal layer 34, the one in-plane direction (arrangement axis D direction) in which the optical axis 40A of the liquid crystal compound 40 changes while rotating is the periodic direction of the diffraction structure.

In the present invention, the length of the single period Λ of the diffraction element is not particularly limited and may be appropriately set depending on the incidence direction into the curved half mirror 20 and the like.

The length of the single period of the cholesteric liquid crystal layer 34 is preferably 0.1 to 10 μm and more preferably 0.2 to 3 μm. It is preferable that the length of the single period of the cholesteric liquid crystal layer 34 is appropriately set depending on the wavelength λ of incident light.

In the cholesteric liquid crystal layer 34 having the liquid crystal alignment pattern, as the single period Λ decreases, the diffraction angle of reflected light with respect to the incidence light increases. That is, as the single period Λ decreases, a variation in the angle of reflected light with respect to specular reflection increases.

In addition, in the cholesteric liquid crystal layer 34 having the liquid crystal alignment pattern, the reflection angle (diffraction angle) of light varies depending on the wavelength of light to be reflected. Specifically, as the wavelength of light increases, the diffraction angle of reflected light with respect to incidence light increases.

Accordingly, as described above, in a case where the cholesteric liquid crystal element 30 includes a plurality of cholesteric liquid crystal layers 34 having the liquid crystal alignment pattern, it is preferable that a permutation of the selective reflection center wavelengths of the plurality of cholesteric liquid crystal layers 34 and a permutation of the single periods Λ match each other.

For example, the cholesteric liquid crystal element 30 includes three cholesteric liquid crystal layers 34 including a cholesteric liquid crystal layer that selectively reflects red light, a cholesteric liquid crystal layer that selectively reflects green light, and a cholesteric liquid crystal layer that selectively reflects blue light.

In this case, the selective reflection center wavelength of the cholesteric liquid crystal layer that selectively reflects red light is the longest, the selective reflection center wavelength of the cholesteric liquid crystal layer that selectively reflects green light is the second longest, and the selective reflection center wavelength of the cholesteric liquid crystal layer that selectively reflects blue light is the shortest.

Accordingly, in this case, regarding the single period Λ in the liquid crystal alignment pattern of each of the cholesteric liquid crystal layers, it is preferable that the single period Λ of the cholesteric liquid crystal layer that has the longest selective reflection center wavelength and selectively reflects red light is the longest, the single period Λ of the cholesteric liquid crystal layer that has the second longest selective reflection center wavelength and selectively reflects green light is the second longest, and the single period Λ of the cholesteric liquid crystal layer that has the shortest selective reflection center wavelength and selectively reflects blue light is the shortest.

With the above-described configuration, the reflection directions of the virtual images A of the colors that are reflected to the curved half mirror 20 by the cholesteric liquid crystal element 30 can be made to be the same.

As a result, a color image having no color shift can be emitted to the observation position by the user U as the virtual image A.

In the example shown in FIG. 3, a configuration in which, on the X-Z plane of the cholesteric liquid crystal layer 34, the optical axes 40A of the liquid crystal compound 40 is aligned to be parallel with respect to the main surface (X-Y plane) is adopted.

However, the present invention is not limited to this configuration. For example, as conceptually shown in FIG. 7, a configuration in which, on the X-Z plane of the cholesteric liquid crystal layer 34, the optical axes 40A of the liquid crystal compound 40 is aligned to be tilted with respect to the main surface (X-Y plane) may be adopted.

Figure 7:
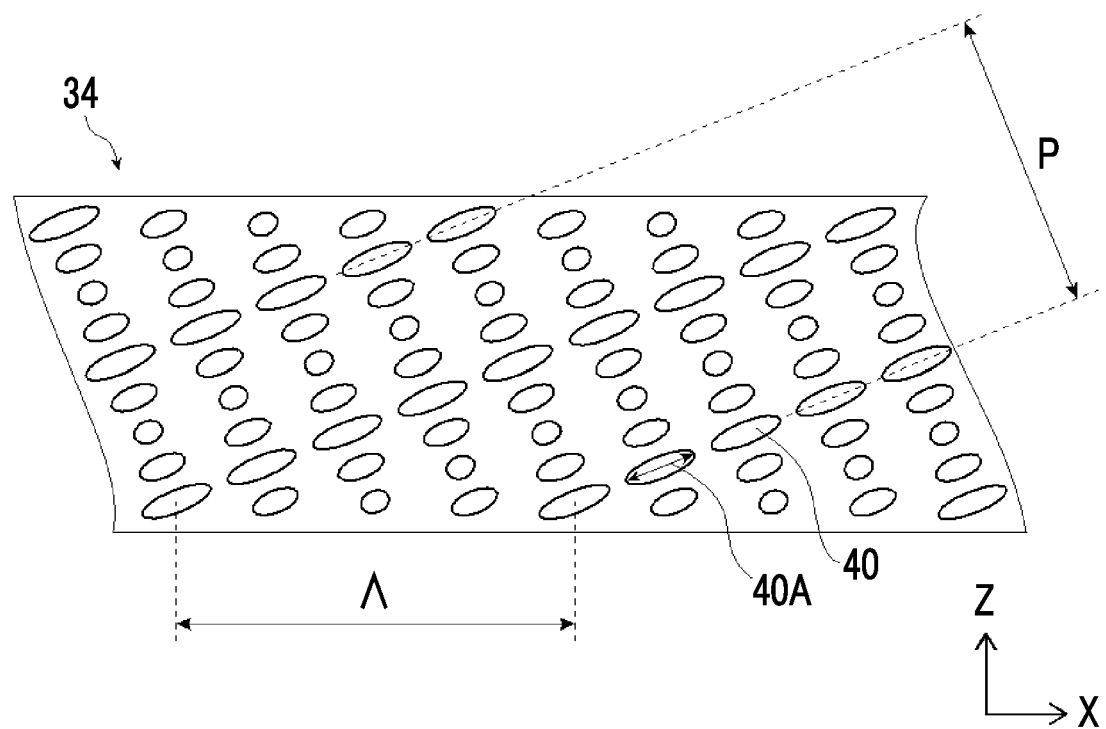
FIG. 7 is a diagram conceptually showing still another example of the cholesteric liquid crystal element.

In addition, the example shown in FIG. 7 shows the configuration in which, on the X-Z plane of the cholesteric liquid crystal layer 34, the tilt angle of the liquid crystal compound 40 with respect to the main surface (X-Y plane) is uniform in the thickness direction (Z direction). However, the present invention is not limited to this configuration. In the cholesteric liquid crystal layer 34, a region where the tilt angle of the liquid crystal compound 40 varies in the thickness direction may be provided.

Figure 8:
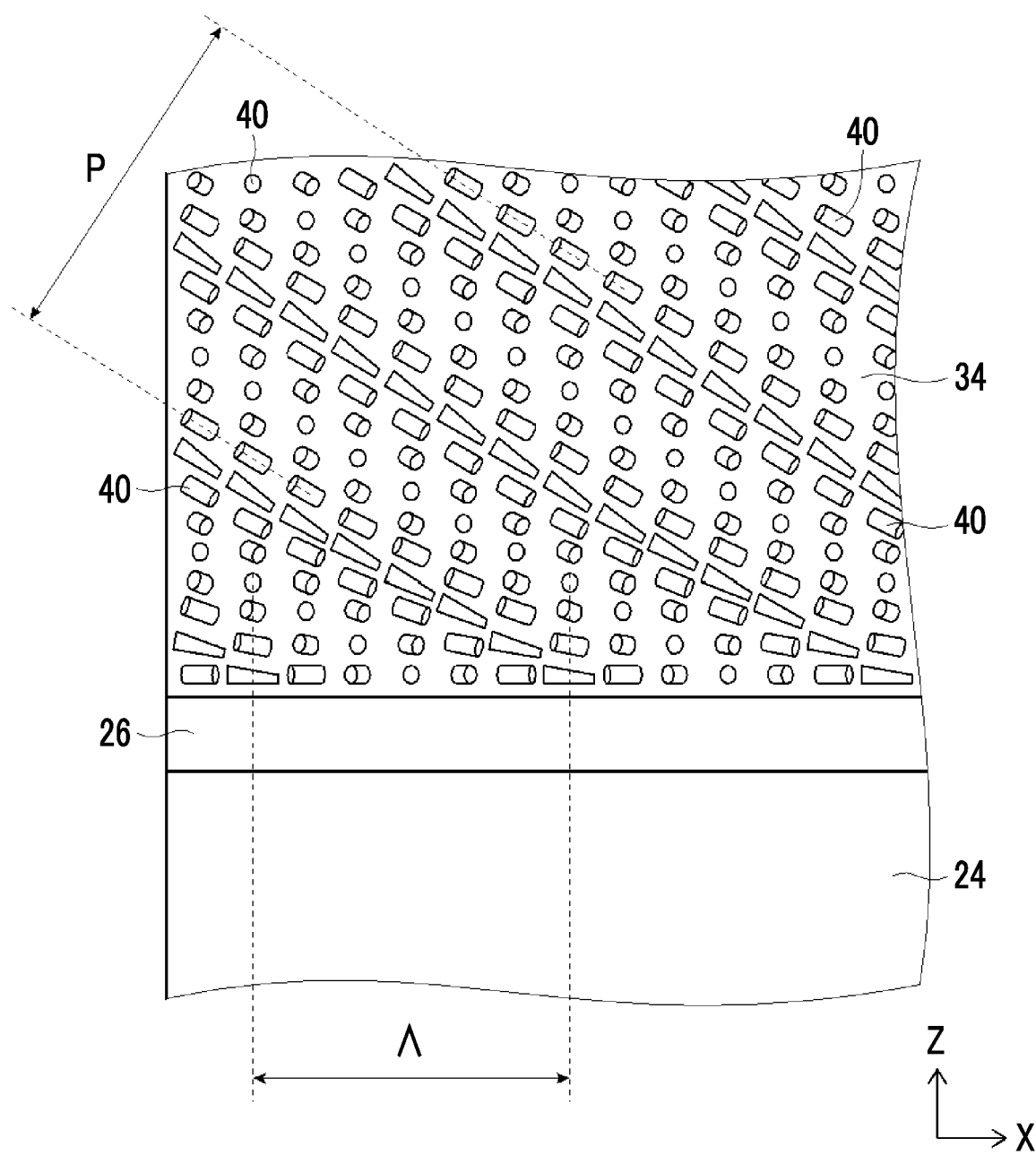
FIG. 8 is a diagram conceptually showing still another example of the cholesteric liquid crystal element.

For example, in an example shown in FIG. 8, the optical axis 40A of the liquid crystal compound 40 at an interface of the liquid crystal layer on the alignment film 26 side is parallel to the main surface (the pretilt angle is 0°), the tilt angle of the liquid crystal compound 40 increases in a direction away from the interface on the alignment film 26 side to the thickness direction, and the liquid crystal compound is aligned at a given tilt angle on another interface (air interface).

This way, the cholesteric liquid crystal layer 34 may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the cholesteric liquid crystal layer 34 with a polarization microscope. In particular, it is preferable that, on the X-Z plane of the cholesteric liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the cholesteric liquid crystal layer 34 (diffraction element) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is preferable that the tilt angle is controlled by treating the interface of the cholesteric liquid crystal layer 34.

By pretilting the alignment film on the support side interface, the tilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, in a cross section of the cholesteric liquid crystal layer 34 observed with a SEM, the bright portions and the dark portions derived from a cholesteric liquid crystalline phase are tilted with respect to the main surface. In the liquid crystal layer, it is preferable that, in a case where an in-plane retardation Re is measured from a normal direction and a direction tilted with respect to a normal line, a direction in which the in-plane retardation Re is the minimum in any one of a slow axis plane or a fast axis plane is tilted from the normal direction. Specifically, it is preferable that an absolute value of the measured angle between the direction in which the in-plane retardation Re is the minimum and the normal line is 5° or more. In other words, it is preferable that the liquid crystal compound of the liquid crystal layer is tilted with respect to the main surface and the tilt direction substantially matches the bright portions and the dark portions of the liquid crystal layer.

By the liquid crystal layer having the above-described configuration, circularly polarized light can be diffracted with a higher diffraction efficiency than the cholesteric liquid crystal layer 34 in which the liquid crystal compound is parallel to the main surface.

In the configuration in which the liquid crystal compound 40 of the cholesteric liquid crystal layer 34 is tilted with respect to the main surface and the tilt direction substantially matches the bright portions and the dark portions, bright portions and dark portions corresponding to a reflecting surface matches the optical axis of the liquid crystal compound 40. Therefore, the action of the liquid crystal compound on light reflection (diffraction) increases, the diffraction efficiency can be improved. As a result, the amount of reflected light with respect to incidence light can be further improved.

In a fast axis plane or a slow axis plane of the cholesteric liquid crystal layer 34, the absolute value of the optical axis tilt angle of the cholesteric liquid crystal layer 34 is preferably 5° or more, more preferably 10° or more, and still more preferably 15° or more.

It is preferable that the absolute value of the tilt angle of the optical axis is 10° or more from the viewpoint that the direction of the liquid crystal compound 40 matches the bright portions and the dark portions more suitably such that the diffraction efficiency can be improved.

The cholesteric liquid crystal layer 34 having the liquid crystal alignment pattern and the PG structure can be formed by forming the cholesteric liquid crystal layer as described above on the alignment film 26 where the alignment pattern is formed as described above.

As described above, the cholesteric liquid crystal layer having the liquid crystal alignment pattern can be used as the transparent reflection element according to the embodiment of the present invention instead of the curved half mirror 20.

Figure 11:
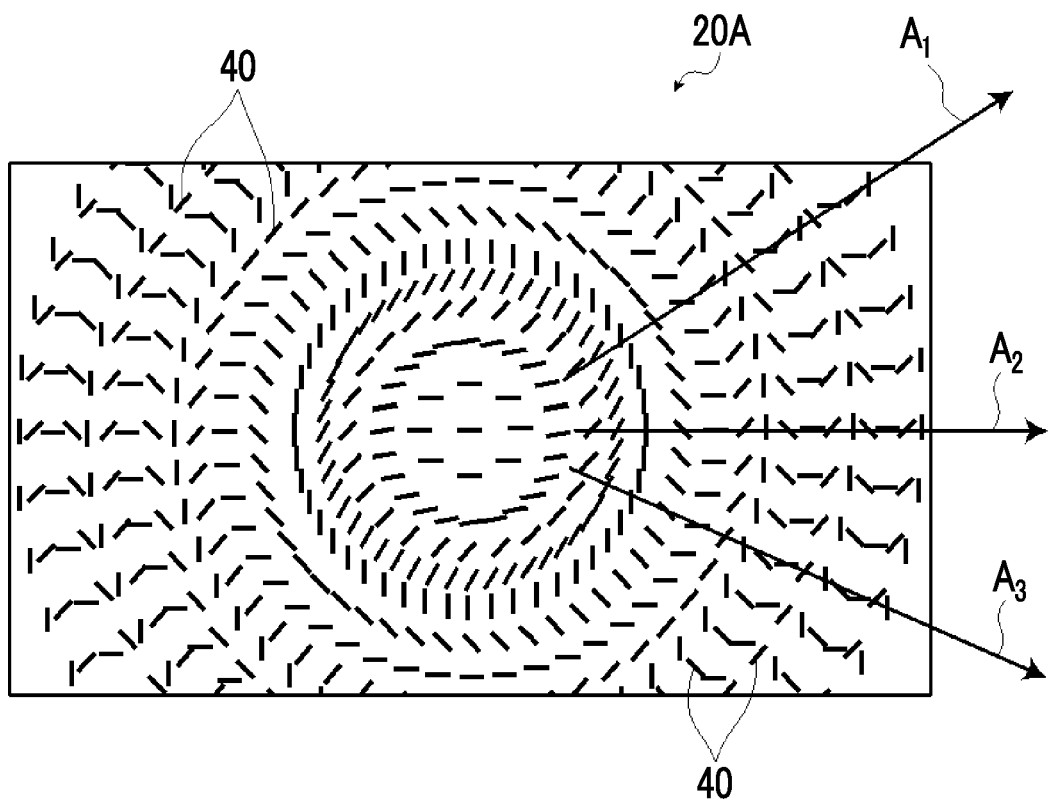
FIG. 11 is a diagram conceptually showing an example of a transparent reflection element.

For example, a transparent reflection element 20A including a cholesteric liquid crystal layer conceptually shown in a plan view of FIG. 11 can be used, in which a liquid crystal alignment pattern is a concentric circular liquid crystal alignment pattern having a concentric circular shape where the one in-plane direction in which the direction of the optical axis of the liquid crystal compound 40 changes while continuously rotating moves from an inner side toward an outer side.

FIG. 11 shows only the liquid crystal compound 40 of the surface of the alignment film as in FIG. 4. However, as shown in FIG. 3, the cholesteric liquid crystal layer has the helical structure in which the liquid crystal compound 40 on the surface of the alignment film is helically turned and rotated as described above. The cholesteric liquid crystal layer used as the transparent reflection element 20A (transparent reflection element) does not need to have the PG structure.

In the cholesteric liquid crystal layer used in the transparent reflection element 20A, the direction of the optical axis of the liquid crystal compound 40 changes while continuously rotating in a direction in which a large number of optical axes move to the outer side from the center of the cholesteric liquid crystal layer, for example, a direction indicated by an arrow $A_1$, a direction indicated by an arrow $A_2$, a direction indicated by an arrow $A_3$, or . . . .

In addition, the rotation directions of the optical axes indicated by the arrows $A_1$, $A_2$, and $A_3$ are reversed with respect to the center of the cholesteric liquid crystal layer.

This way, in the cholesteric liquid crystal layer having the concentric circular liquid crystal alignment pattern, that is, the liquid crystal alignment pattern in which the optical axis changes while continuously rotating in a radial shape, incidence light can be reflected as converging light depending on the rotation direction of the optical axis of the liquid crystal compound 40 and the direction of circularly polarized light to be reflected.

In addition, the cholesteric liquid crystal layer allows transmission of light other than the light having the wavelength range and the turning direction that is selectively reflected.

That is, the transparent reflection element 20A including the cholesteric liquid crystal layer having the concentric circular liquid crystal alignment pattern exhibits a function as a light-transmitting concave mirror having selectivity in a reflection wavelength. Therefore, by using the transparent reflection element 20A as the curved half mirror 20, the image display apparatus according to the embodiment of the present invention can be formed.

[Another Aspect of Image Display Apparatus]

In the above-described image display apparatus, a change in the surface pitch P of the PG structure of the cholesteric liquid crystal layer is relatively small. For example, one cholesteric liquid crystal layer corresponds to any one of red light, green light, or blue light.

However, the present invention is not limited to this configuration, and a change in the surface pitch P of the PG structure of the cholesteric liquid crystal layer is relatively large. For example, one cholesteric liquid crystal layer may correspond to wavelength ranges of a plurality of colors (the width of the wavelength range corresponding to a plurality of colors), such as red light and green light, green light and blue light, or red light, green light, and blue light.

In the following description, the cholesteric liquid crystal layer corresponding to the wavelength range of a plurality of colors will also be referred to as a cholesteric liquid crystal layer having a wide reflection wavelength range.

That is, in the cholesteric liquid crystal layer having a wide reflection wavelength range, a change in the surface pitch P of the PG structure, in other words, a difference in the surface pitch P is significantly large, and the selective reflection wavelength range is very wide. Therefore, the cholesteric liquid crystal layer having a wide reflection wavelength range can selectively reflect right circularly polarized light or left circularly polarized light of red light, green light, and blue light with one layer.

In addition, visible light in a wavelength range of from red light to blue light can be reflected. Therefore, even in a case where the virtual image A displayed by the display element 12 is obliquely incident such that the blue shift of the cholesteric liquid crystal layer occurs, the virtual image A can be suitably reflected. Accordingly, even in a case where the cholesteric liquid crystal layer having a wide reflection wavelength range is used, the virtual image A having high brightness uniformity can be displayed.

The width of the selective reflection wavelength range can be adjusted using the above-described method such as the method of adjusting a difference in the irradiation dose of light in the thickness direction during the formation of the PG structure.

As the image display apparatus according to the embodiment of the present invention including the cholesteric liquid crystal layer having a wide reflection wavelength range, for example, an image display apparatus can be used having the same configuration as the image display apparatus 10 shown in FIG. 1 except that the cholesteric liquid crystal layer having a wide reflection wavelength range is used instead of the cholesteric liquid crystal layer 28 in the cholesteric liquid crystal element 18.

As described above, the cholesteric liquid crystal layer having a wide reflection wavelength range can reflect right circularly polarized light or left circularly polarized light in the entire visible wavelength range with one layer. Accordingly, it is preferable that a display element (display) that displays a full color image using a red image, a green image, and a blue image is used as the display element 12.

In addition, in the image display apparatus according to the embodiment of the present invention including the cholesteric liquid crystal layer having a wide reflection wavelength range, it is preferable that one cholesteric liquid crystal layer is provided.

The cholesteric liquid crystal layer having a wide reflection wavelength range is not limited to the configuration in which only one layer is provided. In the image display apparatus according to the embodiment of the present invention including the cholesteric liquid crystal layer having a wide reflection wavelength range, two or more cholesteric liquid crystal layers may be provided.

Hereinabove, the image display apparatus and the AR glasses according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

Material for Photo-Alignment-

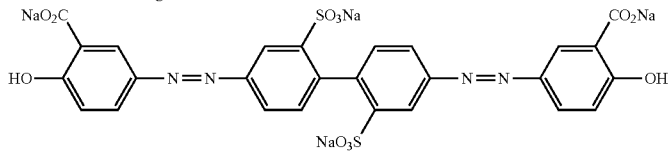

(Exposure of Alignment Film)

By irradiating the obtained alignment film P-1 with polarized ultraviolet light (50 mJ/cm$^2$, using an extra high pressure mercury lamp), the alignment film P-1 was exposed.

(Formation of Cholesteric Liquid Crystal Layer)

As the liquid crystal composition forming the cholesteric liquid crystal layer, the following composition A-1 was prepared. This composition A-1 is a liquid crystal composition forming a cholesteric liquid crystal layer (cholesteric liquid crystalline phase) that reflects right circularly polarized light.

Composition A-1

| | |
|---|---|
| Rod-Like liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 4.98 parts by mass |
| Leveling agent T-1 | 0.08 parts by mass |
| Methyl ethyl ketone | 203.00 parts by mass |

Rod-Like liquid crystal compound L-1

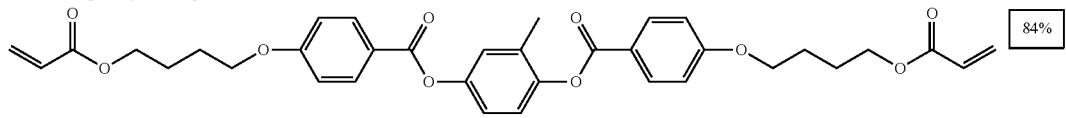 [SMILES: C=CC(=O)OCCCCOc1ccc(C(=O)Oc2ccc(OC(=O)c3ccc(OCCCCOC(=O)C=C)cc3)c(C)c2)cc1]

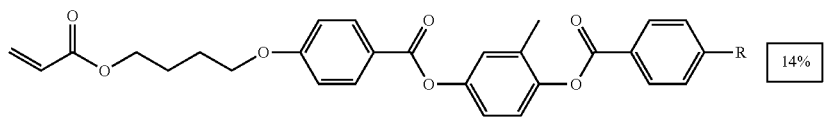

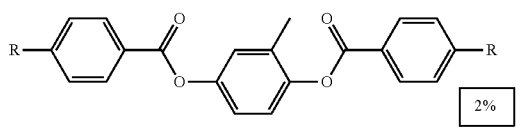

R:

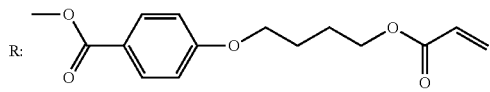

Chiral Agent Ch-1

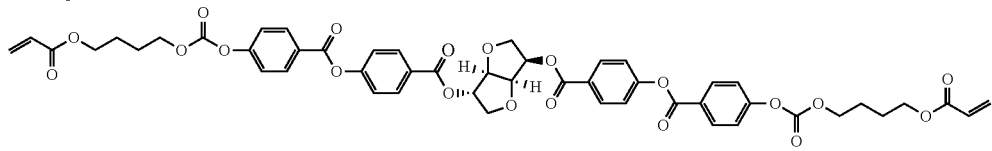

Leveling Agent T-1

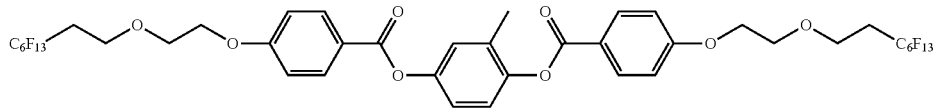

The above-described composition A-1 was applied to the alignment film P-1.

The coating film of the composition A-1 was heated on a hot plate at 80° C. for 3 minutes (180 sec). Next, the coating film was irradiated with ultraviolet light having a wavelength of 365 nm at 80° C. at an irradiation dose of 600 mJ/cm$^2$ using a high-pressure mercury lamp in a nitrogen atmosphere. As a result, the composition A-1 was cured, the alignment of the liquid crystal compound was immobilized, and a cholesteric liquid crystal layer was formed.

A cross section of the cholesteric liquid crystal layer was observed with a SEM.

As a result, bright portions and dark portions were parallel to a main surface of the cholesteric liquid crystal layer, and a surface pitch as an interval of the bright portions and the dark portions in a thickness direction was substantially uniform. The surface pitch of the cholesteric liquid crystalline phase measured from the bright portions and the dark portions was 0.4 µm. The surface pitch P was measured by setting the interval between the bright portions or between the dark portions in the normal direction with respect to the lines as a ½ pitch.

As described above, the bright portions and the dark portions described herein refer to bright portions and dark portions derived from a cholesteric liquid crystalline phase in a case where a cross section of the cholesteric liquid crystal layer was observed with a SEM.

Example 1

Using the same method as that of Comparative Example 1, the alignment film P-1 was formed on a support and exposed.

(Formation of Cholesteric Liquid Crystal Layer))

As the liquid crystal composition forming the cholesteric liquid crystal layer, the following composition A-2 was prepared. This composition A-2 is a liquid crystal composition forming a cholesteric liquid crystal layer (cholesteric liquid crystalline phase) that reflects right circularly polarized light.

Composition A-2

| | |
|---|---|
| Rod-Like liquid crystal compound L-1 | 100.00 parts by mass |
| Polymerization initiator (KAYACURE DETX-S, manufactured by Nippon Kayaku Co., Ltd.) | 1.00 part by mass |
| Chiral agent Ch-1 | 3.55 parts by mass |
| Chiral agent Ch-2 | 1.00 parts by mass |
| Methyl ethyl ketone | 203.00 parts by mass |

Chiral agent Ch-2

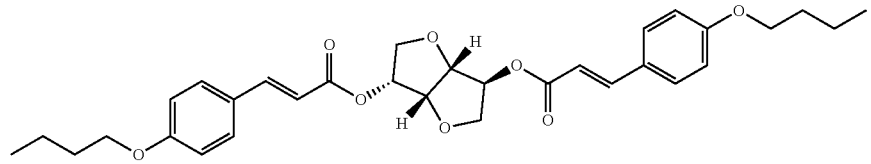 [SMILES: CCCCOc1ccc(/C=C/C(=O)O[C@H]2CO[C@H]3[C@@H]2OC[C@H]3OC(=O)/C=C/c2ccc(OCCCC)cc2)cc1]

The above-described composition A-2 was applied to the alignment film P-1.

The coating film of the composition A-2 was heated on a hot plate at 80° C. for 3 minutes.

Next, the first exposure for changing the HTP of the chiral agent was performed using a high-pressure mercury lamp at 80° C. in the air atmosphere through a long pass filter of 300 nm and a short pass filter of 350 nm. The first exposure was performed such that the light irradiation dose measured at a wavelength of 315 nm was 10 mJ/cm$^2$.

Next, the second expression for curing the liquid crystal composition was performed at 80° C. by irradiating the coating film with ultraviolet light having a wavelength of 365 nm at an irradiation dose of 600 mJ/cm$^2$ using a high-pressure mercury lamp in a nitrogen atmosphere. As a result, the liquid crystal composition A-2 was cured, the alignment of the liquid crystal compound was immobilized, and a cholesteric liquid crystal layer was formed.

A cross section of the cholesteric liquid crystal layer was observed with a SEM.

As a result, bright portions and dark portions were parallel to a main surface of the cholesteric liquid crystal layer, and a state where an interval of the bright portions and the dark portions in a thickness direction, that is, a surface pitch continuously increased in the thickness direction from the alignment film side to a side away from the alignment film was observed. In addition, the average value of the surface pitch was 0.4 μm.

Example 2

Using the same method as that of Comparative Example 1, the alignment film P-1 was formed on a support and exposed.

(Formation of Cholesteric Liquid Crystal Layer)

As the liquid crystal composition forming the cholesteric liquid crystal layer, the following composition A-3 was prepared. This composition A-3 is a liquid crystal composition forming a cholesteric liquid crystal layer (cholesteric liquid crystalline phase) that reflects right circularly polarized light.

Composition A-3

| | |
|---|---|
| Rod-Like liquid crystal compound L-1 | 100.00 parts by mass |
| Polymerization initiator (KAYACURE DETX-S, manufactured by Nippon Kayaku Co., Ltd.) | 1.00 part by mass |
| Chiral agent Ch-3 | 3.4 parts by mass |
| Methyl ethyl ketone | 142.00 parts by mass |

Chiral Agent Ch-3

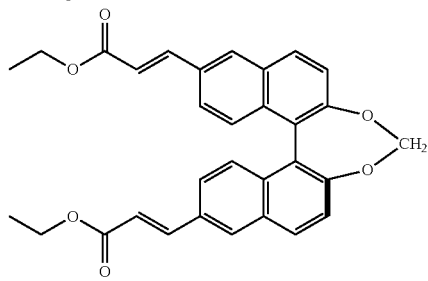

The above-described composition A-3 was applied to the alignment film P-1.

The coating film of the composition A-3 was heated on a hot plate at 100° C. for 3 minutes.

Next, the first exposure for changing the HTP of the chiral agent was performed using a high-pressure mercury lamp at 100° C. in a nitrogen atmosphere through a long pass filter of 300 nm and a short pass filter of 350 nm. The first exposure was performed such that the light irradiation dose measured at a wavelength of 315 nm was 9 mJ/cm$^2$.

Next, the second expression for curing the liquid crystal composition was performed at 100° C. by irradiating the coating film with ultraviolet light having a wavelength of 365 nm at an irradiation dose of 1000 mJ/cm$^2$ using a high-pressure mercury lamp in a nitrogen atmosphere. As a result, the liquid crystal composition A-3 was cured, the alignment of the liquid crystal compound was immobilized, and a cholesteric liquid crystal layer was formed.

A cross section of the cholesteric liquid crystal layer was observed with a SEM.

As a result, bright portions and dark portions were parallel to a main surface of the cholesteric liquid crystal layer, and a state where an interval of the bright portions and the dark portions in a thickness direction, that is, a surface pitch continuously increased in the thickness direction from the alignment film side to a side away from the alignment film was observed. A change in the surface pitch from the alignment film side to a side away from the alignment film was more than that of Example 1. In addition, the average value of the surface pitch was 0.4 µm.

Example 3

Using the same method as that of Comparative Example 1, the alignment film P-1 was formed on a support.
(Exposure of Alignment Film)

The alignment film was exposed using the exposure device shown in FIG. 9 to form an alignment film PG-1 having an alignment pattern.

In the exposure device, a laser that emits laser light having a wavelength (325 nm) was used as the laser. The exposure amount of the interference light was 300 mJ/cm$^2$. The single period (the length over which the optical axis rotates by 180°) of an alignment pattern formed by interference of two laser beams was controlled by changing an intersecting angle (intersecting angle α) between the two beams.
(Formation of Cholesteric Liquid Crystal Layer)

A composition A-4 was prepared using the same method as that of the composition A-2 forming the cholesteric liquid crystal layer according to Example 1, except that the amount of the chiral agent Ch-1 was changed to 3.9 parts by mass.

A cholesteric liquid crystal layer was formed using the same method as that of Example 1, except that the composition A-4 was used.

It was verified with a polarization microscope that the cholesteric liquid crystal layer had a periodic liquid crystal alignment pattern in which an optical axis of the liquid crystal compound rotated in one in-plane direction as shown in FIG. 4.

The cholesteric liquid crystal layer was cut in a direction along the rotation direction of the optical axis of the liquid crystal compound, and a cross section was observed with a SEM.

As a result, bright portions and dark portions were tilted to a main surface of the cholesteric liquid crystalline phase. In addition, a shape where an interval of the bright portions and the dark portions in a thickness direction, that is, a tilted surface pitch continuously increased in the thickness direction, and a tilt angle of the bright portions and the dark portions also continuously increased from the alignment film side to a side away from the alignment film was observed. Regarding the surface pitch of the bright portions and the dark portions tilted with respect to the main surface, an interval between bright portions or between dark portions in the normal direction with respect to the inclined surface was set as a ½ pitch. The tilt angle (tilt angle of the bright portions/the dark portions) refers to an angle of the bright portions or the dark portions with respect to the main surface of the cholesteric liquid crystal layer.

As a result of observing the cross section with a SEM, the average value of the surface pitch (tilted surface pitch) of the bright portions and the dark portions tilted with respect to the main surface in the thickness direction was 0.37 µm. In addition, in the liquid crystal alignment pattern of the cholesteric liquid crystal layer, the single period over which the optical axis of the liquid crystal compound rotated by 180° was 0.61 µm.

Evaluation (Reflection Wavelength Range)

Using a gonio-spectrophotometer (GSP-1B, manufactured by Murakami Color Research Laboratory Co., Ltd.), the reflection wavelength range of the cholesteric liquid crystal layer was measured with the above-described method.

In Comparative Example 1 and Examples 1 and 2, the reflection wavelength range was measured in a case where light was incident from a direction tilted at 45° with respect to the normal line of the cholesteric liquid crystal layer. In Example 3, the reflection wavelength range was measured in a case where light was incident from a direction tilted at 60° with respect to the normal line of the cholesteric liquid crystal layer. In Example 3, the reflection angle varied depending on wavelengths, and thus the measurement was performed while changing the angle of the light receiving section.
(Brightness Uniformity)

Using the prepared cholesteric liquid crystal layer (cholesteric liquid crystal element), the image display apparatus shown in FIG. 1 was prepared.

A laser having a wavelength of 532 nm was used as a display element (light source), a circular polarization plate was disposed on a front surface of the light source, and right circularly polarized light was incident into the cholesteric liquid crystal layer.

In Comparative Example 1 and Examples 1 and 2, the cholesteric liquid crystal layer was disposed such that an angle between an optical axis of the lens and a normal line of the cholesteric liquid crystal layer was 45°. In Example 3, the cholesteric liquid crystal layer was disposed such that the angle was 60°.

While changing the incidence angle in a range of ±20° with respect to an angle where an optical path of incidence light from the display element matched the optical axis of the lens, light was made to be incident, and reflected light from the curved mirror was measured using a power meter. That is, in Comparative Example 1 and Examples 1 and 2, light was incident in a range of 25° to 65° with respect to the normal line of the cholesteric liquid crystal layer. In Example 3, light was incident in a range of 40° to 80° with respect to the normal line of the cholesteric liquid crystal layer.

Using the measurement result of the power meter, the brightness uniformity was evaluated based on the average value of the amount of light reflected from the curved mirror with respect to the incidence angle in a range of ±20°.

As a result, the brightness uniformity of Example 2 was the highest (Evaluation A), the brightness uniformity of Examples 1 and 3 was the second highest (Evaluation B), and the brightness uniformity of Comparative Example was the lowest (Evaluation C).

In Examples 1 and 3, the evaluation results of the brightness uniformity were the same. However, in Example 3, the cholesteric liquid crystal layer was disposed such that the angle of the normal line with respect to the optical axis of the lens was 60°, and thus the entire apparatus can be minimized.

The results are shown in the following table.

TABLE 1

|  |  | Comparative Example 1 | Example 1 | Example 2 | Example 3 |
|---|---|---|---|---|---|
| Cholesteric Liquid Crystal Layer | Surface Pitch [μm] | 0.4 | 0.4 | 0.4 | 0.37 |
|  | Change in Surface Pitch |  |  |  |  |
|  | Length of Single Period of Alignment Pattern [μm] | — | — | — | 0.61 |
|  | Angle between Lens Optical Axis and Normal Line [°] | 45 | 45 | 45 | 60 |
| Evaluation | Reflection Wavelength Range [nm] | 50 | 100 | 200 | 100 |
|  | Brightness Uniformity | C | B | A | B |

As can be seen from the above results, the effects of the present invention are obvious.

The present invention is suitably applicable to an image display apparatus such as AR glasses or a HUD that displays augmented reality.

Explanation of References

10, 10A, 100: image display apparatus
12, 102: display element
14, 104: lens
16: retardation plate
18, 30: cholesteric liquid crystal element
20, 108: curved half mirror
20A: transparent reflection element
24: support
26: alignment film
28, 34: cholesteric liquid crystal layer
40: liquid crystal compound
40A: optical axis
42: bright portion
44: dark portion
60: exposure device
62: laser
64: light source
65: λ/2 plate
68: polarization beam splitter
70a, 70B: mirror
72A, 72B: λ/4 plate
106: beam splitter
A: virtual image
R: real scene
G$_R$: right circularly polarized light of green light
M: laser light
MA, MB: beam
P$_O$: linearly polarized light
P$_R$: right circularly polarized light
P$_L$: left circularly polarized light
U: user
D: arrangement axis
Λ: single period (period of diffraction structure)
P: surface pitch

What is claimed is:

1. An image display apparatus comprising:
a display element;
a cholesteric liquid crystal layer that reflects an image displayed by the display element and is obtained by immobilizing a cholesteric liquid crystalline phase; and
a transparent reflection element that reflects the image of the display element reflected by the cholesteric liquid crystal layer to the cholesteric liquid crystal layer,
wherein one or more cholesteric liquid crystal layers are provided and at least one of the cholesteric liquid crystal layers has a pitch gradient structure that is a structure having a region where a helical pitch of a helical structure of the cholesteric liquid crystalline phase changes,
the cholesteric liquid crystal layer has a liquid crystal alignment pattern in which a direction of an optical axis derived from a liquid crystal compound changes while continuously rotating in at least one in-plane direction,
in the thickness direction of the cholesteric liquid crystal layer, the helical pitch is continuously increased,
a length of a single period of the liquid crystal alignment pattern is 0.1 to 10 μm, the single period being a length, in the one in-plane direction, over which a direction of the optical axis derived from the liquid crystal compound rotates by 180° in the one in-plane direction, and the direction of an optical axis derived from the liquid crystal compound changing while continuously rotating in the one in-plane direction, and
an angle between a normal line of the cholesteric liquid crystal layer and an incidence direction of a virtual image into the cholesteric liquid crystal layer is more than 45°.

2. The image display apparatus according to claim 1, wherein a plurality of the cholesteric liquid crystal layers having different the helical pitches are provided.

3. The image display apparatus according to claim 1, wherein all of the cholesteric liquid crystal layers have the pitch gradient structure.

4. The image display apparatus according to claim 1, wherein a selective reflection wavelength range of the cholesteric liquid crystal layer having the pitch gradient structure is 80 nm or more.

5. The image display apparatus according to claim 4, wherein only one cholesteric liquid crystal layer is provided.

6. The image display apparatus according to claim 1, wherein a retardation plate is provided between the display element and the cholesteric liquid crystal layer.

7. The image display apparatus according to claim 6, wherein the retardation plate is a λ/4 wave plate.

8. AR glasses comprising:
the image display apparatus according to claim 1.

9. The image display apparatus according to claim 2, wherein a permutation of lengths of the helical pitches and a permutation of lengths of the single periods in the liquid crystal alignment patterns match each other in the plurality of cholesteric liquid crystal layers having different the helical pitches.

* * * * *